(12) United States Patent
Phillips et al.

(10) Patent No.: US 12,473,443 B2
(45) Date of Patent: Nov. 18, 2025

(54) COMPOSITIONS FOR MARKING TISSUE AND METHODS OF MAKING THE SAME

(71) Applicant: Vector Surgical, LLC, Waukesha, WI (US)

(72) Inventors: Janet Louise Favero Phillips, Nashotah, WI (US); Amanda Katsma, West Bend, WI (US); Debora L. Hense, Plymouth, MI (US)

(73) Assignee: Vector Surgical LLC, Waukesha, WI (US)

( * ) Notice: Subject to any disclaimer, the term of this patent is extended or adjusted under 35 U.S.C. 154(b) by 931 days.

(21) Appl. No.: 17/646,908

(22) Filed: Jan. 4, 2022

(65) Prior Publication Data
US 2023/0212411 A1    Jul. 6, 2023

(51) Int. Cl.
C09D 11/00    (2014.01)
C09D 11/17    (2014.01)

(52) U.S. Cl.
CPC ..................... C09D 11/17 (2013.01)

(58) Field of Classification Search
USPC .......................................... 106/31.01, 31.03
See application file for complete search history.

(56) References Cited

U.S. PATENT DOCUMENTS

| | | | |
|---|---|---|---|
| 6,261,576 B1 * | 7/2001 | Fishman | A61Q 19/04 424/61 |
| D634,011 S | 3/2011 | Phillips et al. | |
| 8,301,227 B2 | 10/2012 | Phillips et al. | |
| 8,750,966 B2 | 6/2014 | Phillips et al. | |
| 10,492,886 B2 | 12/2019 | Phillips et al. | |
| 2017/0189135 A1 * | 7/2017 | Phillips | A61B 90/90 |
| 2019/0159862 A1 | 5/2019 | Phillips et al. | |
| 2020/0163848 A1 | 5/2020 | Goutsis et al. | |
| 2021/0045992 A1 | 2/2021 | Lingoes et al. | |

FOREIGN PATENT DOCUMENTS

| | | | | |
|---|---|---|---|---|
| JP | 2018532834 A | * | 11/2018 | ............ C09D 5/028 |
| WO | 2020152093 A1 | | 7/2020 | |

OTHER PUBLICATIONS

International Search Report and Written Opinion mailed Mar. 31, 2023 for PCT/US2022/082188 (16 pp.).
Aucklah, "Ink Formulation and Rheological Characterisation of Zirconia Screen Printing Inks," (Jun. 2011) (Ph.D. dissertation, Loughborough University) (37 pp.).

* cited by examiner

*Primary Examiner* — James E McDonough
(74) *Attorney, Agent, or Firm* — Fox Rothschild LLP

(57) ABSTRACT

A marking composition for marking a tissue specimen is provided. The marking composition includes a film forming resin including an acrylic resin, a rheology modifier including an associative polyurethane, a phyllosilicate, a cellulose, or a combination thereof, and a colorant. The composition has a viscosity of about 70 KU to about 110 KU at room temperature. If the composition includes a rheology modifier comprising cellulose, it is in an amount of about 0.01 wt % to about 0.25 wt % based on the total weight of the composition.

18 Claims, 10 Drawing Sheets

INK ADHERENCE--% COVERAGE

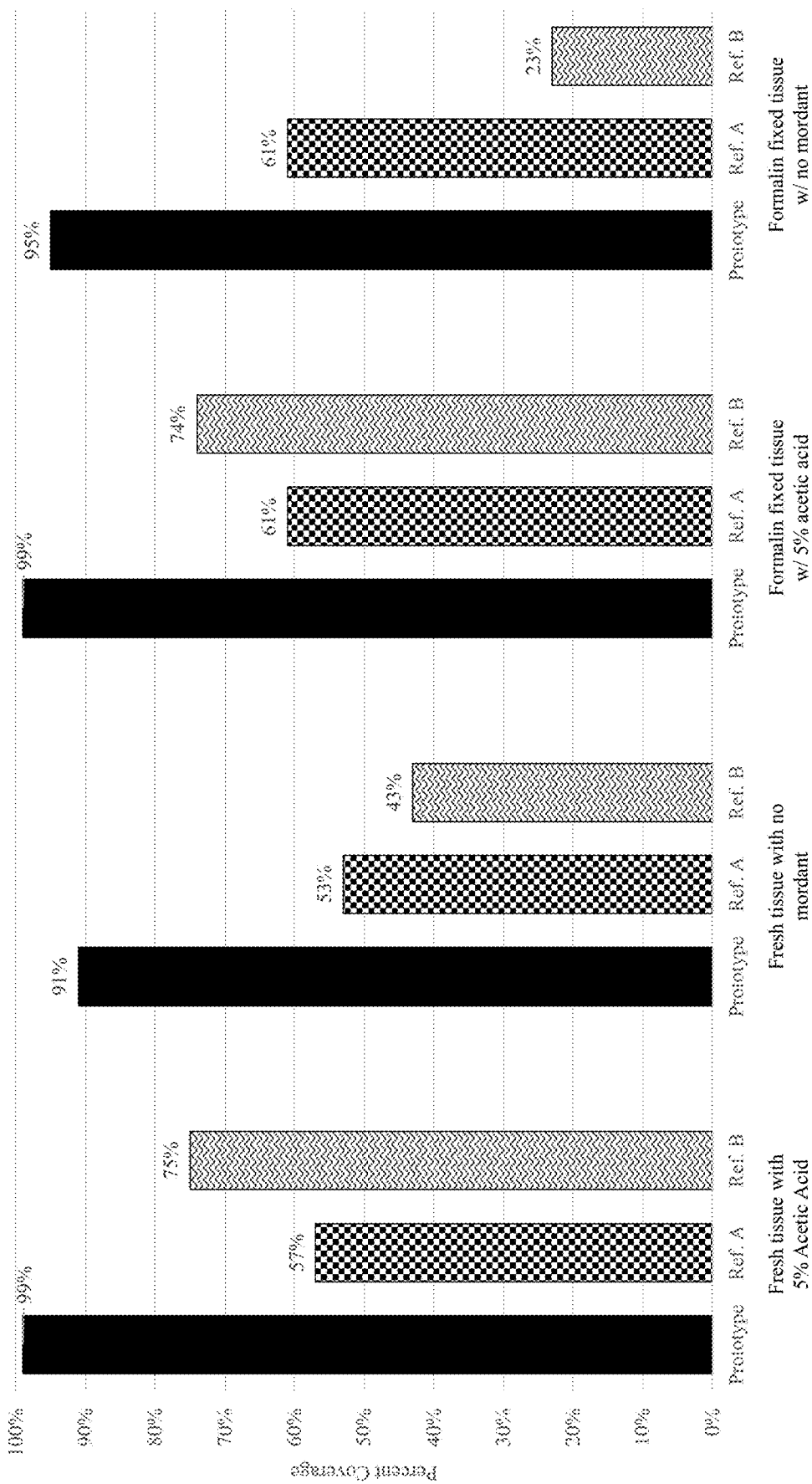
FIGURE 1. INK ADHERENCE—% COVERAGE

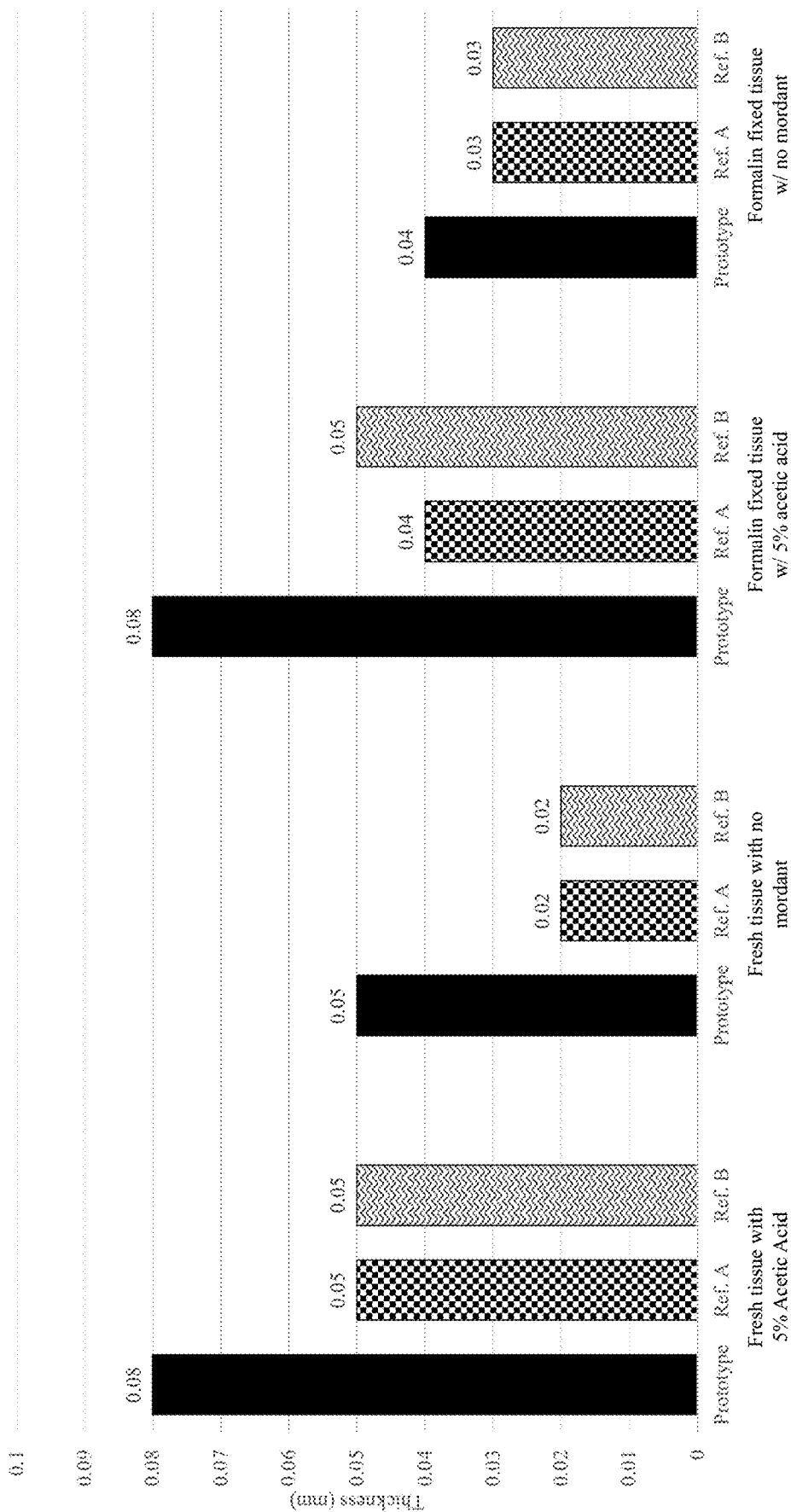

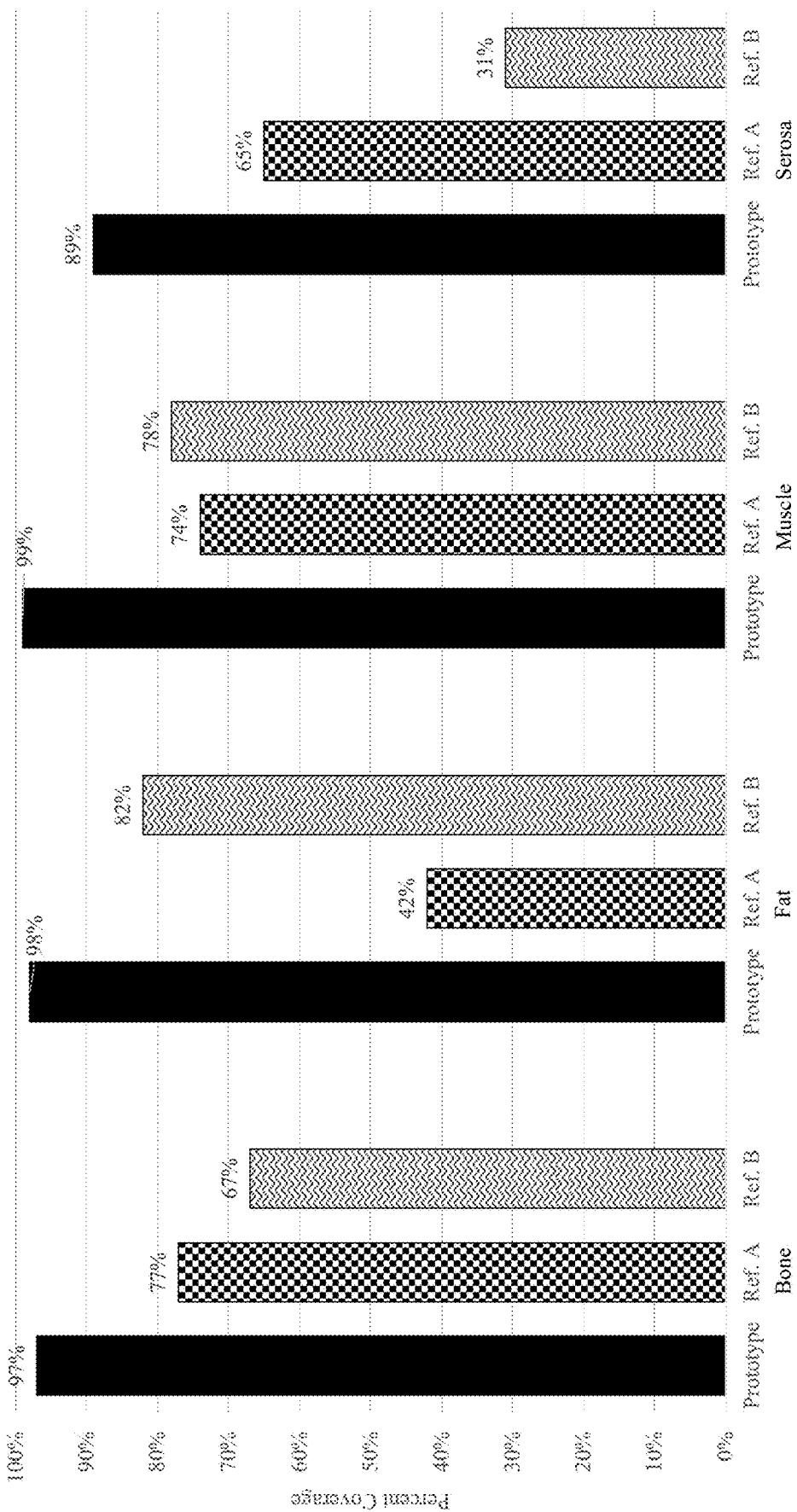
FIGURE 3. INK AND TISSUE TYPE ON ADHERENCE–COVERAGE

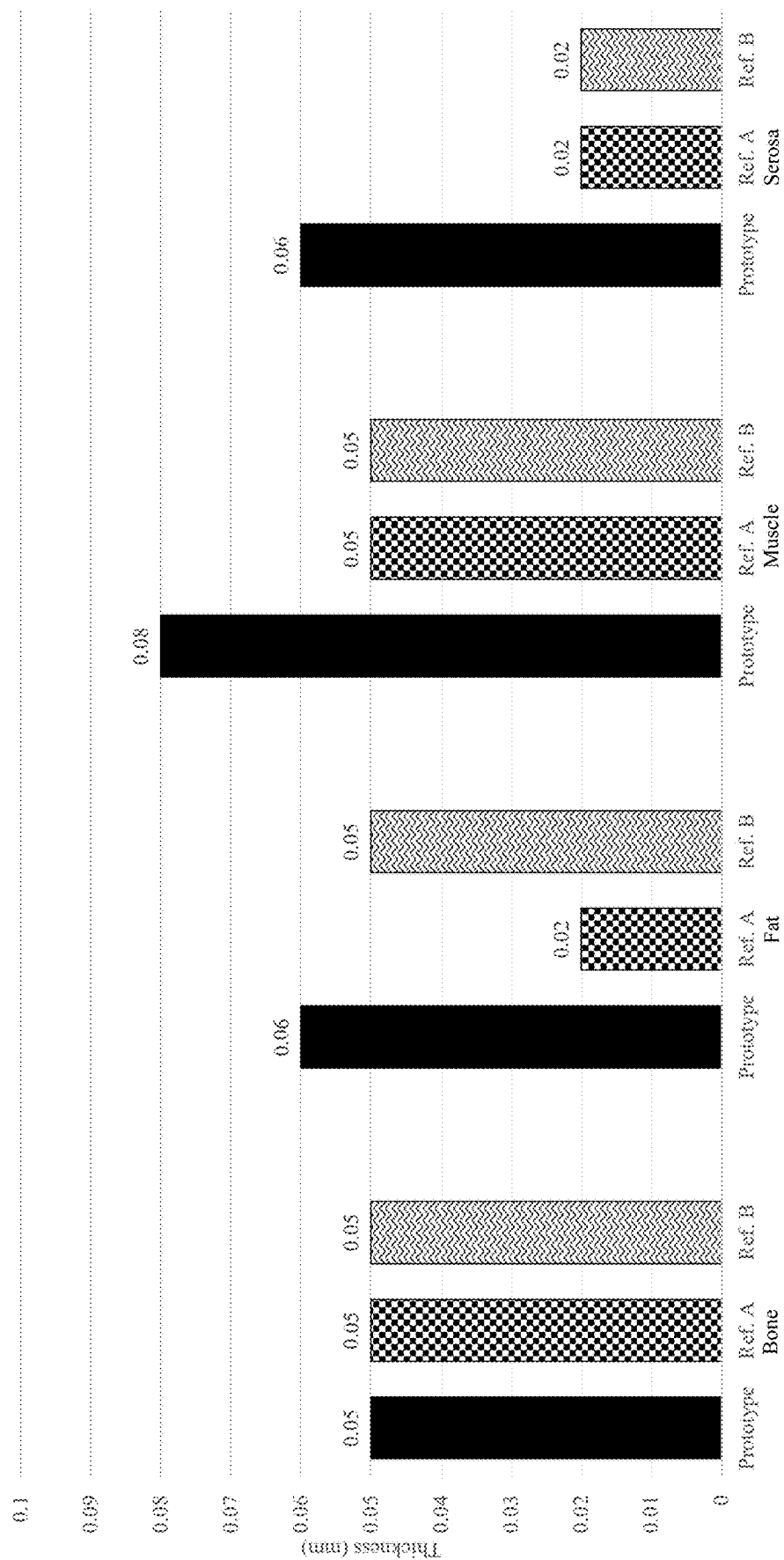

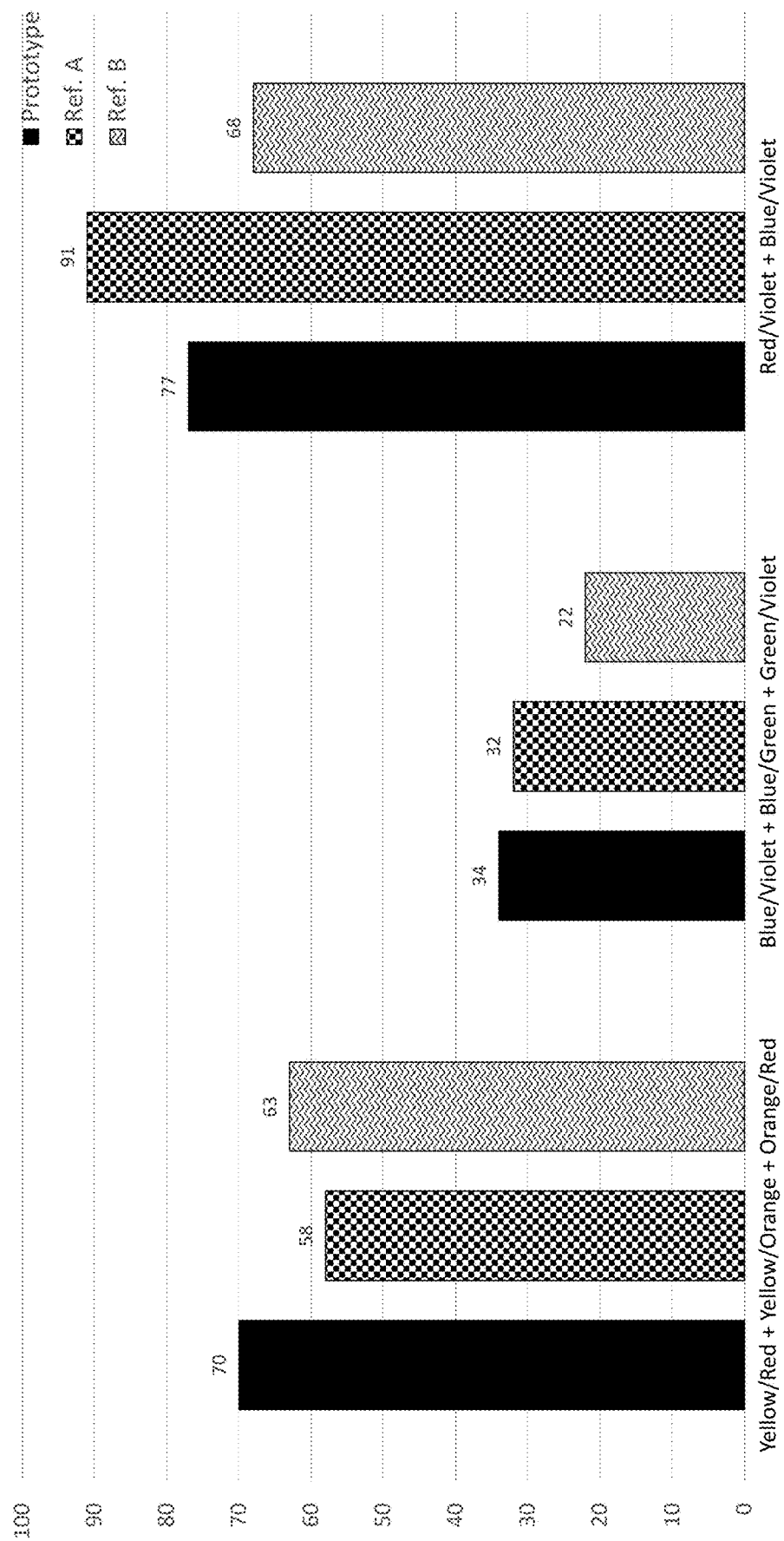
FIGURE 5. DELTA E AVERAGES FOR REFLECTED LIGHT

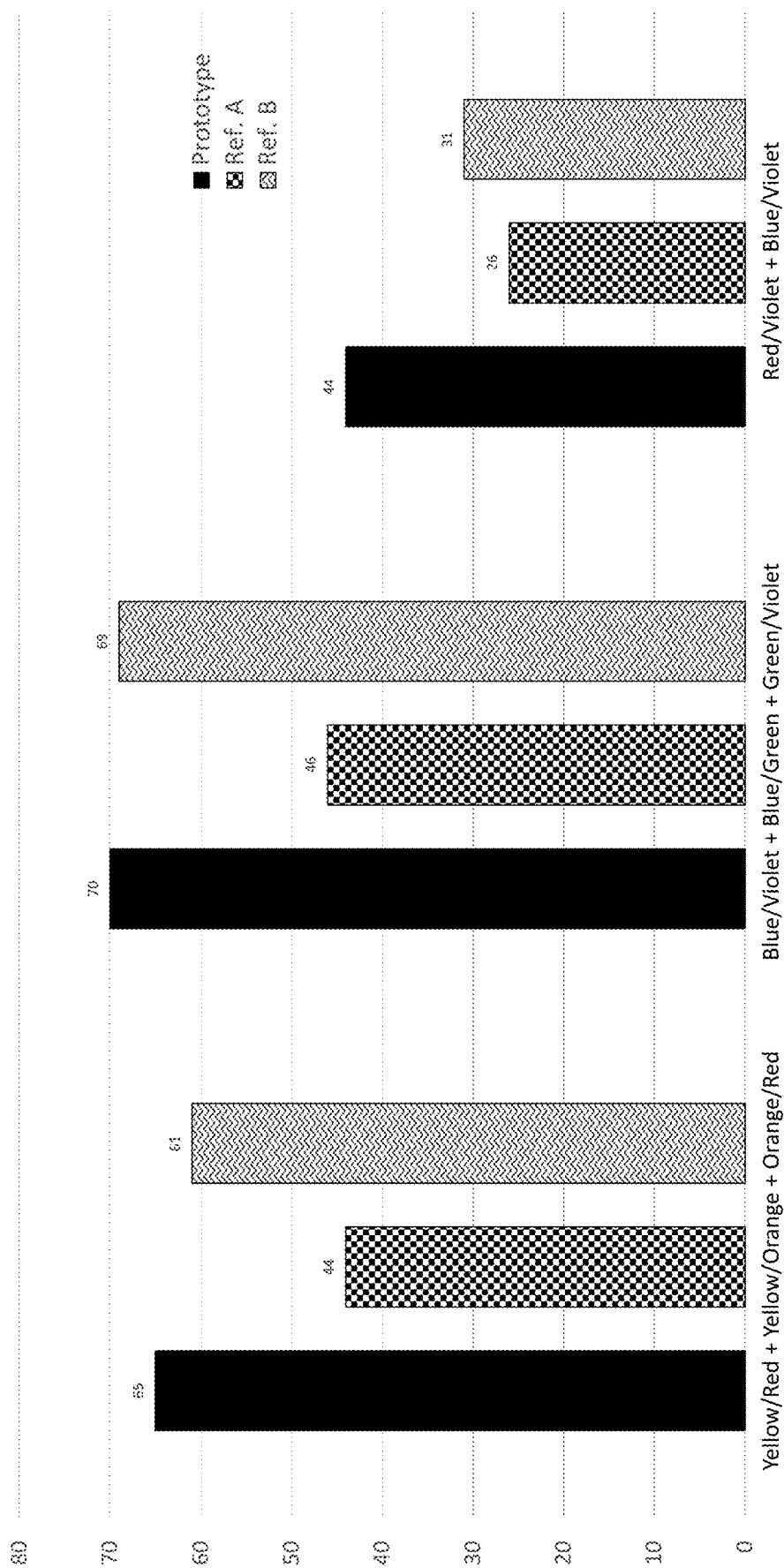
FIGURE 6. DELTA E AVERAGES FOR TRANSMITTED LIGHT

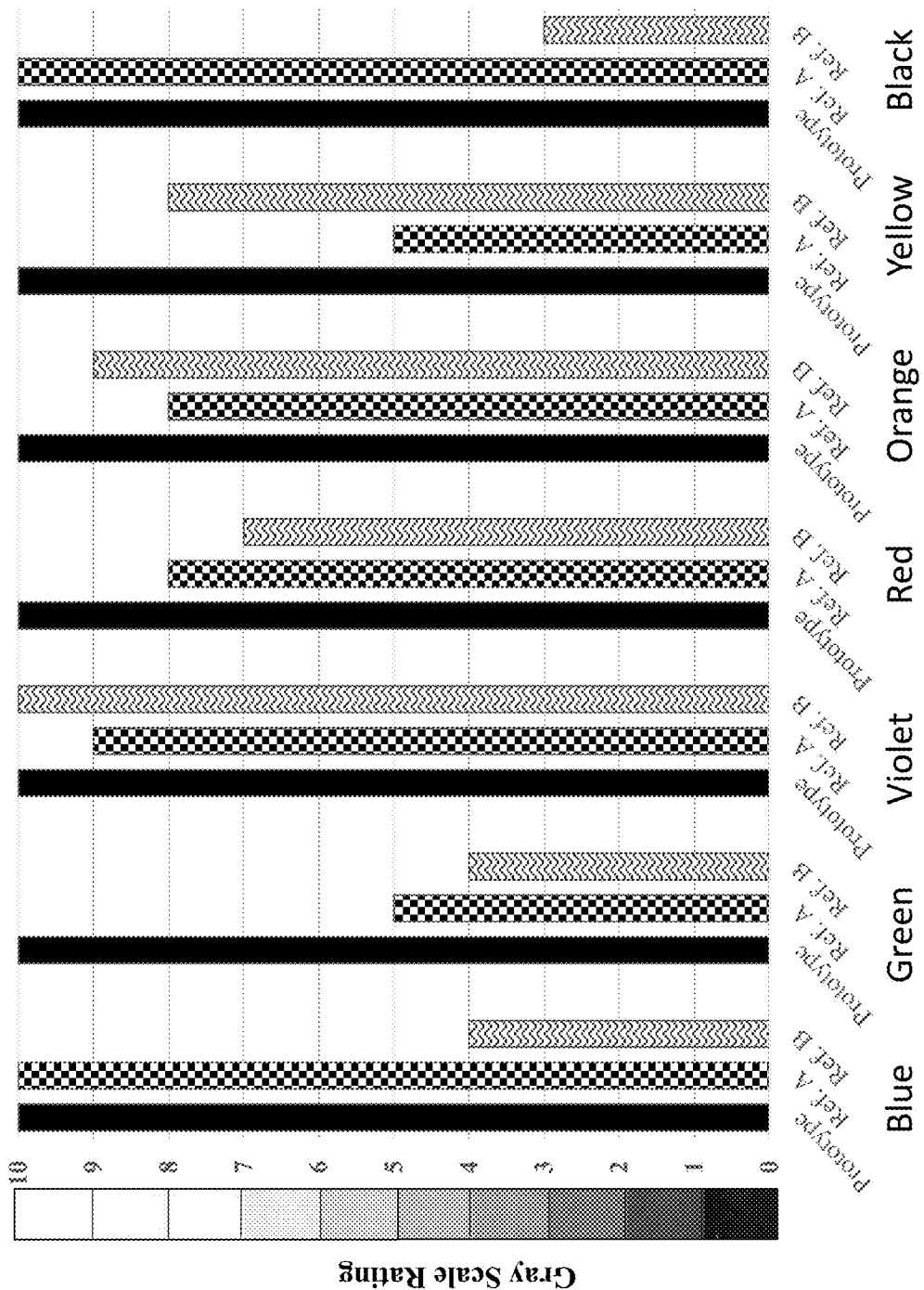
FIGURE 7. EFFECTS OF INK TYPE AND COLOR ON FORMALIN LEECHING

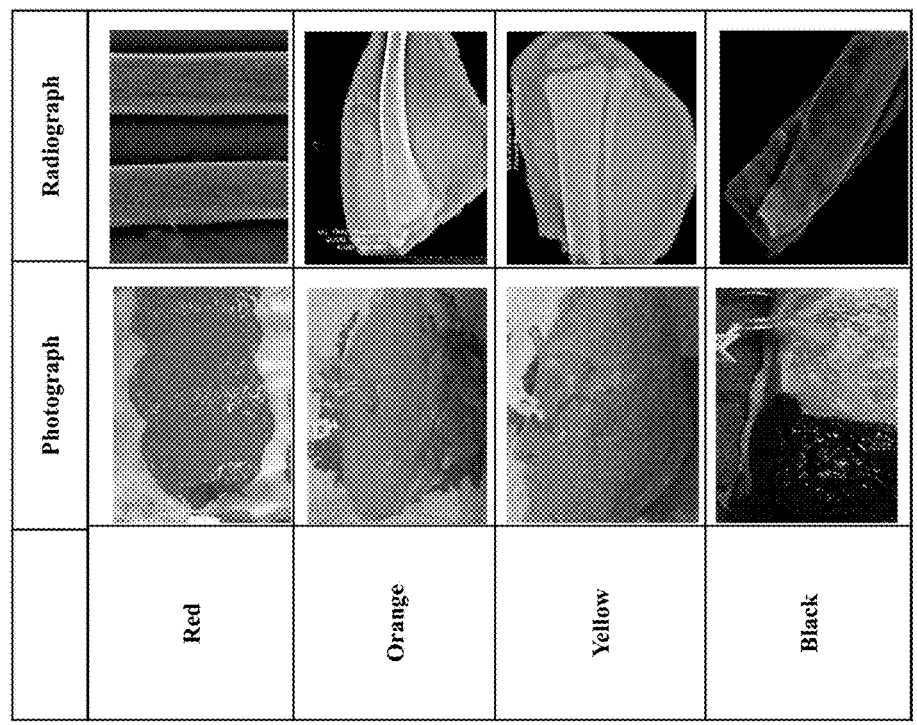
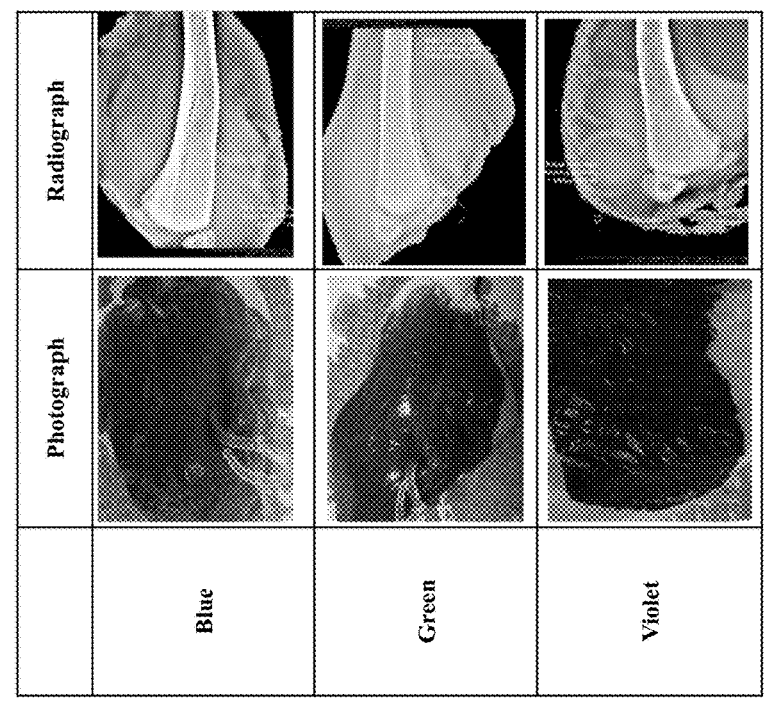
FIGURE 8. PROTOTYPE FORMULATIONS ON PHOTOGRAPHS AND RADIOGRAPHS

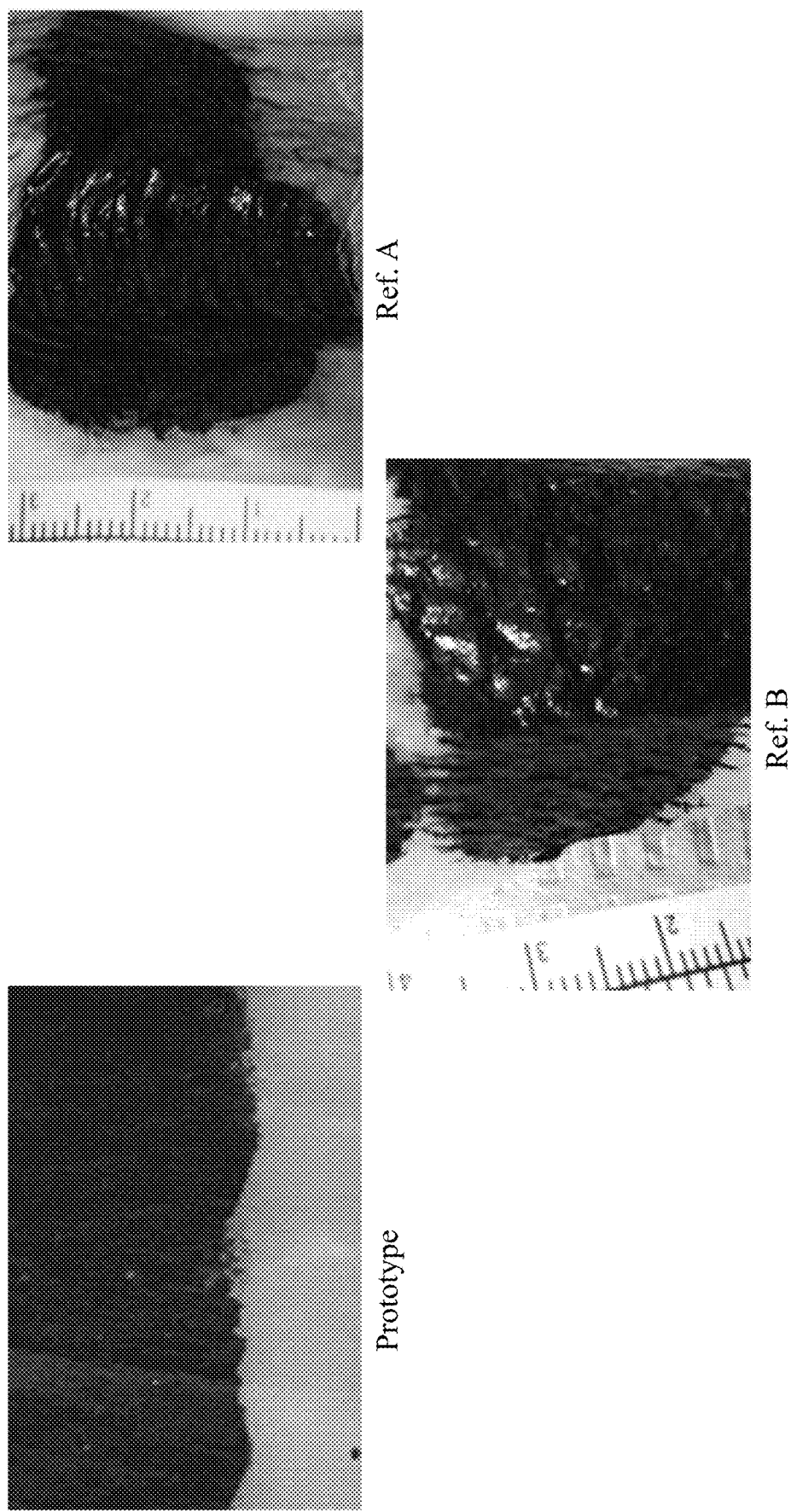
FIGURE 9: COMPARISON OF GREEN MARKING COMPOSITION ON RUNNING, POOLING AND DRIPPING

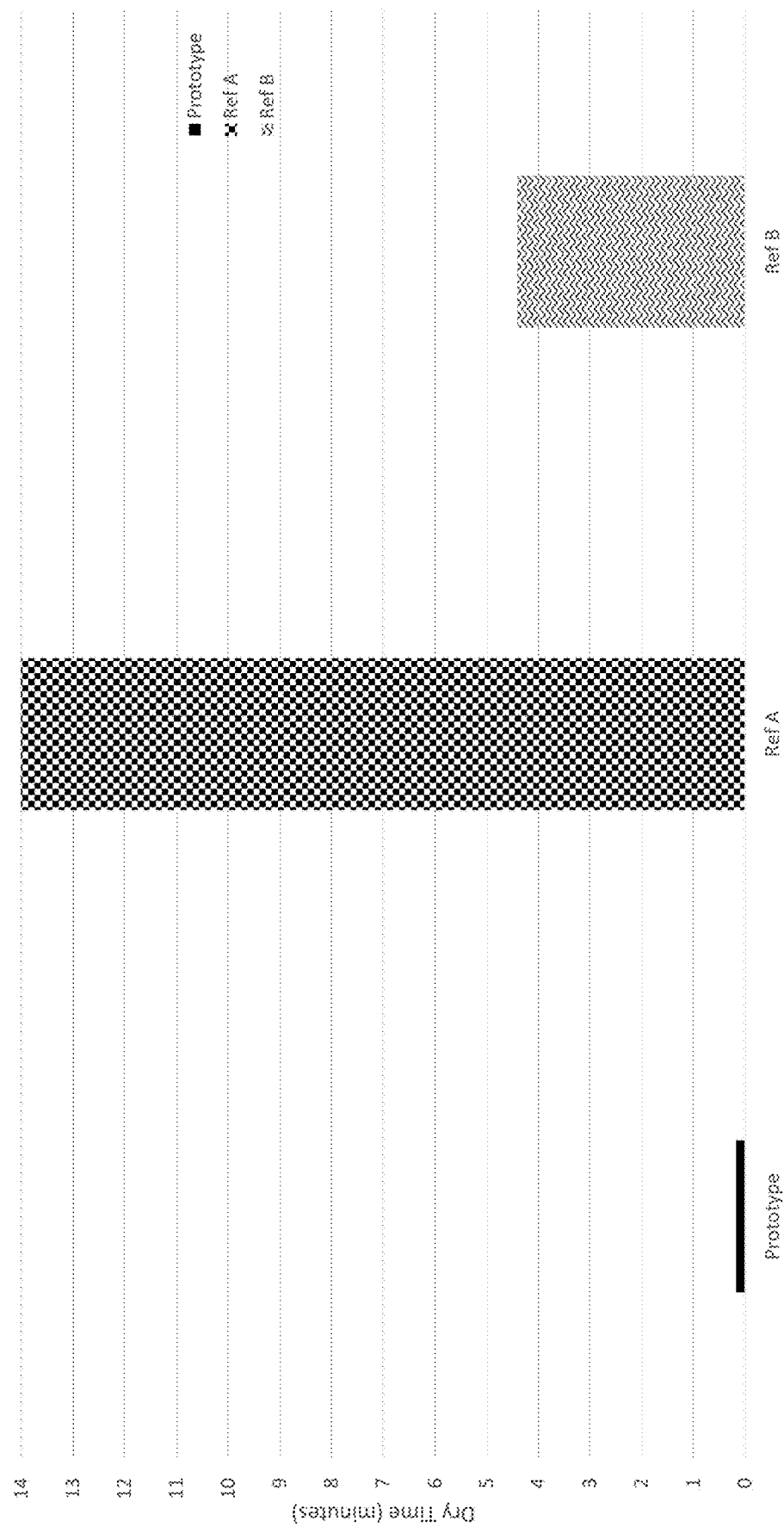
FIGURE 10. AVERAGE DRYING TIMES

COMPOSITIONS FOR MARKING TISSUE AND METHODS OF MAKING THE SAME

FIELD

The present disclosure generally relates to compositions that are useful in marking tissue specimens.

BACKGROUND

When diseased tissue is removed from a patient, it may be analyzed in the pathology lab to estimate if any diseased cells remain in the patient's body. Pathologists often use inks or other marking compositions to mark the exterior surfaces, or margins of excised tissue in surgery. For some types of surgery, such as breast cancer surgery, the excised tissue specimen is also evaluated by X-ray during an operation. The surgeon usually marks excised tissue using either ink or suture to designate specimen margins and orientation before it is sent to the pathology lab.

The clinical status of the tissue margin is considered one of the most important factors in predicting whether there will be a recurrence of the disease. Accurate identification and reporting of the clinical status of tissue margins (i.e., "clear of diseased cells" or "positive for diseased cells") is clinically relevant in a wide range of pathology specimens. A margin is designated as "clear" when no irregular cells are found at the specimen's edge. Conversely, a "positive" result is designated when irregular cells are found at the edge of the specimen, and the implication is that not all diseased tissue was removed during surgery. In these cases, a second surgery or additional clinical treatment to address the remaining disease in the patient's body may be recommended.

Tissue marking inks or other media are an important tool used in determining margin status and specimen orientation and affect the subsequent clinical action that may be taken. For a subsequent surgery or clinical treatment to effectively address any remaining diseased cells, it is essential that the original shape and location of the excised tissue be accurately determined. Compositions that mark the anatomy or the positioning of the excised tissue to indicate how it was originally positioned in the patient's body provide direction to physicians on where to target the subsequent surgery or treatment.

A tissue specimen is often an irregular-shaped, disrupted piece of tissue with fissures, crevasses, or flaps on the surface. Accordingly, the composition used to mark the tissue should be capable of marking accurately despite the irregularities in the surface of the specimen.

Additionally, such marking compositions must adhere to tissue quickly and effectively for an accurate analysis in the pathology lab. Thus, it is critical that the marking composition that is applied to the surface of the tissue dries quickly and adheres securely, maintaining the integrity of the marking, without running, dripping, or migrating to an unintended adjacent area on the surface of the specimen or into a fissure or crevasse. If the marking composition does not dry quickly, the fidelity of the markings is affected, and the composition may smear or migrate on the tissue surface. If the marking composition migrates to an adjacent area on the surface of the tissue to an unintended location, and that area is determined to have diseased cells close to the surface, then the surgical re-excision or clinical treatment directed at remaining cells in the patient may target the wrong location, resulting in untreated irregular cells which may cause a recurrence of the disease. The most serious negative outcome is a local recurrence of the life-threatening disease. If the marking composition migrates into a fissure or crevasse in the tissue, the pathology report may result in a "false positive," because the irregular cells appear closer to the exterior surface of the tissue specimen than they actually were. A false positive could result in unnecessary surgery or clinical treatment for the patient, increasing morbidity and poor cosmetic outcomes. For example, in breast cancer cases, re-excisions occur for up to 60% of lumpectomy patients, and of these, as many as 66% are false positives.

Accordingly, there is a need for marking compositions that are clearly distinguishable from each other under both reflected ambient light and transmitted light, that consistently adhere to the tissue during standard lab usage, and that are capable of marking the tissue accurately and effectively.

SUMMARY

In one aspect, the disclosed technology relates to a marking composition comprising a film forming resin comprising an acrylic resin; a rheology modifier comprising an associative polyurethane, a phyllosilicate, a cellulose, or a combination thereof, and a colorant, wherein the composition has a viscosity of about 70 KU to about 110 KU at room temperature, and wherein if the composition comprises a rheology modifier comprising cellulose, the rheology modifier comprising cellulose is in an amount of about 0.01 wt % to about 0.25 wt % based on the total weight of the composition.

A marking composition disclosed herein may include a film forming resin comprising an acrylic resin; 0.01 wt % to 1.0 wt % of a rheology modifier comprising an associative polyurethane, wherein wt % is based on total weight of the composition, a colorant comprising a blue colorant, a violet colorant, or a combination thereof, and an extender comprising titanium dioxide, wherein the composition has a viscosity of about 70 KU to about 110 KU at room temperature.

A marking composition may include a film forming resin comprising an acrylic resin, 0.01 wt % to 1.0 wt % of a rheology modifier comprising an associative polyurethane, wherein wt % is based on total weight of the composition, a colorant comprising an orange colorant, wherein the composition has a viscosity of about 70 KU to about 110 KU at room temperature.

In another aspect, the disclosed technology relates to a marking composition comprising a film forming resin comprising an acrylic resin, 1.5 wt % to 2.0 wt % of a rheology modifier comprising a phyllosilicate, wherein wt % is based on total weight of the composition, a colorant comprising a red or a black colorant, wherein the composition has a viscosity of about 70 KU to about 110 KU at room temperature.

In another aspect, the disclosed technology relates to a marking composition comprising a film forming resin comprising an acrylic resin, 0.01 wt % to 0.25 wt % of a rheology modifier comprising a cellulose, wherein wt % is based on total weight of the composition, a colorant comprising a green colorant, a yellow colorant, or a combination thereof, a dispersant, an extender comprising clay, wherein the composition has a viscosity of about 70 KU to about 110 KU at room temperature.

In another aspect, the disclosed technology relates to a method of marking a tissue described herein, including the steps of contacting the tissue with a marking composition comprising a film forming resin comprising an acrylic resin, a rheology modifier comprising an associative polyurethane, a phyllosilicate, a cellulose, or a combination thereof, and a colorant, wherein the composition has a viscosity of about 70 KU to about 110 KU at room temperature, and wherein if the composition comprises a rheology modifier comprising cellulose, the rheology modifier comprising cellulose is in an amount of about 0.01 wt % to about 0.25 wt % based on the total weight of the composition.

In another aspect, the disclosed technology relates to a kit comprising a marking composition and instructions for use thereof, wherein the marking composition comprises a film forming resin comprising an acrylic resin, a rheology modifier comprising an associative polyurethane, a phyllosilicate, a cellulose, or a combination thereof, and a colorant, wherein the composition has a viscosity of about 70 KU to about 110 KU at room temperature, and wherein if the composition comprises a rheology modifier comprising cellulose, the rheology modifier comprising cellulose is in an amount of about 0.01 wt % to about 0.25 wt % based on the total weight of the composition.

BRIEF DESCRIPTION OF THE DRAWINGS

The accompanying drawings, which are incorporated herein and constitute part of this specification, are illustrative of particular embodiments of the present disclosure and do not limit the scope of the present disclosure.

FIG. 1 is a bar graph illustrating adherence of an exemplary marking composition ("Prototype") of this disclosure compared to reference commercially available marking compositions, "Ref. A" and "Ref. B", on fresh vs. formalin fixed tissue and with or without mordant (5% acetic acid) as measured by the percentage of tissue surface covered. Average coverage across seven colors (green, blue, violet, red, orange, yellow, and black) of each of Prototype, Ref. A, and Ref. B is shown. Prototype marking compositions had at least 75% coverage, while Ref. A and Ref. B has less coverage.

FIG. 2 is a bar graph illustrating adherence of an exemplary marking composition ("Prototype") of this disclosure compared to reference commercially available marking compositions, "Ref. A" and "Ref. B", on fresh vs. formalin fixed tissue and with or without mordant (5% acetic acid) as measured by average thickness of the marking composition on the coated tissue. Average thickness across seven colors of each of Prototype, Ref. A, and Ref. B is shown. Prototype marking compositions performed better than reference marking compositions Ref. A and Ref. B.

FIG. 3 is a bar graph illustrating adherence of an exemplary marking composition ("Prototype") of this disclosure compared to reference commercially available marking compositions, "Ref. A" and "Ref. B", on various tissue types (bone, fat, muscle, and serosa) as measured by the percentage of tissue surface covered. Average coverage was determined across seven colors of each of Prototype, Ref. A, and Ref. B. Prototype marking compositions had stronger performance for adherence compared to Ref. A and Ref. B compositions when applied to a variety of tissue types, including fat, bone, muscle and serosa.

FIG. 4 is a bar graph illustrating adherence of an exemplary marking composition ("Prototype") of this disclosure compared to reference commercially available marking compositions, "Ref. A" and "Ref. B", on various tissue types (bone, fat, muscle, and serosa) as measured by thickness of the marking composition on the coated tissue. Average thickness was determined across seven colors of each of Prototype, Ref. A, and Ref. B. Prototype marking compositions had a strong performance for adherence when applied to a variety of tissue types, including fat, bone, muscle and serosa.

FIG. 5 is a bar graph illustrating the Delta E (metric to express the difference between marking composition colors) under reflected light for an exemplary marking composition ("Prototype") of this disclosure compared to reference commercially available marking compositions, "Ref. A" and "Ref. B". Marking composition colors that typically are easily confused were compared such as yellow/red, yellow/orange, and orange/red; blue/violet, blue/green, and green/violet; red/violet and blue/violet. Prototype marking compositions were easily differentiated from one another, showing an average Delta E of at least 30 for all color distinctions under reflected light.

FIG. 6 is a bar graph illustrating the Delta E (metric to express the difference between marking composition colors) under transmitted light for an exemplary marking composition ("Prototype") of this disclosure compared to reference commercially available marking compositions, "Ref. A" and "Ref. B". Marking composition colors that typically are easily confused were compared such as yellow/red, yellow/orange, and orange/red; blue/violet, blue/green, and green/violet; red/violet and blue violet. Prototype marking compositions were easily differentiated from one another, showing an average Delta E of at least 30 for all color distinctions under transmitted light.

FIG. 7 is a bar graph illustrating the amount of leeching when fresh tissue (chicken muscle) was marked with an exemplary marking composition ("Prototype") of this disclosure compared to reference commercially available marking compositions, "Ref. A" and "Ref. B", where the tissue was submerged for 24 hours into formalin after the marking compositions was applied. Prototype marking compositions showed no leeching, unlike Ref. A or Ref. B.

FIG. 8 includes images of the prototype marking compositions in various colors when viewed as a photograph or a radiograph. Each row shows both a photograph and a radiograph of the same marked specimen. No evidence of the prototype marking composition was seen on specimen radiographs.

FIG. 9 includes images showing migration of the marking composition such as running, dripping or pooling for an exemplary green marking composition ("Prototype") of this disclosure compared to reference commercially available marking compositions, "Ref. A" and "Ref. B", when such marking composition is applied to chicken muscle. Prototype marking compositions showed minimal migration, while Ref. A and Ref. B showed significant migration.

FIG. 10 is a bar graph illustrating the average drying time for a fresh tissue (chicken muscle) marked with an exemplary marking composition ("Prototype") of this disclosure compared to reference commercially available marking compositions, "Ref. A" and "Ref. B". Average drying time was determined across seven colors of each of Prototype, Ref. A, and Ref. B. To determine the average drying time, a microswab was rolled 360 degrees across each marked surface in alternating locations and the amount of ink transfer was documented. A marked specimen was determined to be dry when the microswab contained the marking composition on 25% or less of its surface. Prototype marking compositions showed a faster drying time than Ref. A or Ref. B.

DETAILED DESCRIPTION

The following discussion omits or only briefly describes conventional features of the disclosed technology that are apparent to those skilled in the art. Reference to various embodiments does not limit the scope of the claims attached hereto. Additionally, any examples set forth in this specification are intended to be non-limiting and merely set forth some of the many possible embodiments for the appended claims. Further, particular features described herein can be used in combination with other described features in each of the various possible combinations and permutations. A person of ordinary skill in the art would know how to use the instant invention, in combination with routine experiments, to achieve other outcomes not specifically disclosed in the examples or the embodiments.

It is also to be understood that the terminology used in the description is for the purpose of describing the particular versions or embodiments only, and is not intended to limit the scope of the present disclosure which will be limited only by the appended claims. Unless otherwise specifically defined herein, all terms are to be given their broadest possible interpretation including meanings implied from the specification as well as meanings understood by those skilled in the art and/or as defined in dictionaries, treatises, etc. Unless defined otherwise, all technical and scientific terms used herein have the same meanings as commonly understood by one of ordinary skill in the art. Although any methods, equipment, and materials similar or equivalent to those described herein can be used in the practice or testing of embodiments of the present disclosure, the preferred methods, devices, and materials are now described. All references mentioned herein are incorporated by reference in their entirety.

The disclosure relates to marking compositions that adhere to and mark tissue specimens without dripping or migration. In addition, the disclosure relates to a method of using the marking compositions to mark tissue specimens and methods of making such marking compositions.

The marking compositions disclosed herein adhere to a wide variety of tissue types, do not run, drip, bleed, migrate, or smear, onto adjacent tissue margins or into the interior of the specimen when the tissue is cut; adhere to both fresh tissue and tissue that has been previously fixed in formalin before the marking composition is applied, and in both conditions, both with and without the use of mordant; stay adhered to tissue when the specimen is placed into formalin after marking compositions are applied; have colors that are recognizable and distinct from other colors under both reflective light and transmitted light; are not detectable on an X-ray; do not leave artifacts that are visible on imaging; dry when applied to tissue within about 3 minutes or less; and maintain color and performance characteristics when exposed to gamma radiation. In addition, the marking compositions withstand all customary tissue processing and clinical testing, including but not limited to Frozen Section, immunohistochemistry (IHC) testing, and Decalcification procedures, that could occur in the process of evaluating tissue in a medical pathology lab.

As shown in FIG. 9, there was no migration of the marking composition such as running, dripping or pooling when an exemplary green marking composition of this disclosure (Prototype) was applied to chicken muscle. Prototype marking composition had crisp edges and stays where applied with bright colors that was easily recognized whereas Ref. A and Ref. B showed migration at the edges and "bleeding" into other areas of the tissue. Additionally, the colors of Ref. A and Ref. B were dark and not easily recognized under reflective light.

Notably, the marking composition disclosed herein is effective on fatty tissue, one of the most difficult tissue types on which to achieve adhesion. Similarly, the marking composition disclosed herein may be suitable for use on bone, muscle, or serosa, and is not limited to those tissue types.

The tissue marking composition described herein may include a film forming resin comprising an acrylic resin; a rheology modifier comprising a polyether urea polyurethane, a phyllosilicate, a cellulose, or a combination thereof, and a colorant, wherein the composition has a viscosity of about 70 KU to about 110 KU at room temperature, and wherein if the composition comprises a rheology modifier comprising cellulose, the rheology modifier comprising cellulose is in an amount of about 0.01 wt % to about 0.25 wt % based on the total weight of the composition.

The film forming resin may comprise an acrylic resin. For example, the acrylic resin may include acrylics, acrylates, methacrylate polymers or copolymers, styrene acrylics, styrene acrylates, or styrene methacrylate polymers or copolymers. The acrylic resin may be an alkali soluble styrene. The film forming resin may comprise an acrylic styrene copolymer dispersion, such as a modified acrylic/styrene copolymer dispersion having a pH of 8.0-8.6, a total solids w/w of 46%-48%, and a viscosity of 250-650 mPa·s at 25° C., alone or in combination with one or more additional film forming resin.

The marking composition may include at least about 10 wt %, at least about 13 wt %, at least about 15 wt %, at least about 20 wt %, at least about 25 wt %, less than about 80 wt %, less than about 75 wt %, less than about 70 wt %, less than about 60 wt %, less than about 50 wt %, less than about 40 wt % of the film forming resin based on weight of the total composition or a range between any two of these values. For example, the marking composition may include about 13 wt % to about 80 wt %, about 13 wt % to about 75 wt %, about 13 wt % to about 50 wt %, about 30 wt % to about 70 wt %, about 14 wt % to about 75 wt %, about 16 wt % to about 70 wt %, about 12 wt % to about 47 wt %, about 13 wt % to about 46 wt % about 12 wt % to about 80 wt %, about 13 wt % to about 40 wt %, about 14 wt % to about 47 wt %, about 18 wt % to about 20 wt %, about 29 wt % to about 34 wt %, about 29 wt % to about 31 wt %, about 32 wt % to about 34 wt %, about 48 wt % to about 52 wt %, or about 72 wt % to about 77 wt % of the film forming resin.

Preferably, the film forming resin is compatible with the colorant or combination of colorants used in the marking composition. It was determined that if the amount of the film forming resin is lower the above stated ranges, the coverage and thickness of the marking composition was detrimentally reduced, causing drying time to increase, the marking composition to migrate, leaching of the marking composition when the tissue was stored in formalin and separation of the marking composition. For example, with respect to the film forming resin, a marking composition having less than about 13 wt % will result in a marking composition that disadvantageously forms a non-continuous film which appears flaky and brittle on tissue with poor adhesion. When too much film forming resin was used in the marking compositions, such as above the ranges disclosed herein, the color may become diluted under transmitted and reflective light and the drying time for the marking composition may be too fast, making production and application of the marking compositions difficult. For example, a marking composition containing more than about 80 wt % of the film forming resin may result in a marking composition color that is less vibrant under reflective light when applied to the tissue, and potentially interfere with the performance of the marking composition when viewed on the slides under transmitted light.

The marking composition of the present disclosure may have a drying time of about 3 minutes or less, such as less than 3 minutes, about 2 minutes or less, about 1 minute or less, or about 30 seconds or less. Drying time may be determined by rolling a microswab on a marked surface where the microswab has 25% or less of its surface covered with the marking composition. As shown in FIG. 10, the prototype marking compositions of the present disclosure had an average drying time (indicated by the average amount of time required to have 25% or less of the microswab with the marking composition) of about 10 seconds whereas the reference marking compositions both had a drying time over three minutes (with Ref. A bring greater than 14 minutes and Ref. B being about 4.4 minutes). Drying Time is key to efficiency for medical personnel who apply inks to tissue, including those in the pathology lab and surgeons in the operating room so that time is not wasted waiting for the marking compositions to dry on the specimen.

The marking composition disclosed herein further includes a rheology modifier. The rheology modifier and the amount used should be compatible with the colorant such that the colorant's appearance in texture, hue, lightness, darkness, or other respects in reflected and transmitted light is not altered by the rheology modifier. The rheology modifier may include any known thickening agents for use in the art, such as, but not limited to, an associative polyurethane rheology modifier, a phyllosilicate rheology modifier, a rheology modifier comprising cellulose, bentonite clay rheology modifier, polyamide rheology modifier, hydrophobically modified ethylene oxide urethane rheology modifier, polyacrylic acid based rheology modifier, or any combination thereof. For example, the rheology modifier may include a non-ionic, water soluble cellulose ether, an associative polyurethane rheology modifier such as a polyether urea polyurethane associative rheology modifier, and/or a phyllosilicate rheology modifier such as a mixture of a natural clay and xanthan gum.

The marking composition may include greater than 0 wt % to about 3 wt %, about 0.01 wt % to about 3 wt %, 0.01 wt % to about 0.25 wt % about 0.01 wt % to about 2 wt %, about 0.01 wt % to about 1.9 wt %, about 0.01 wt % to about 1.8 wt %, about 0.05 wt % to about 1.9 wt %, about 0.01 wt % to about 0.8 wt %, about 0.01 wt % to about 0.3 wt %, about 0.01 wt % to about 0.2 wt %, or about 0.05 wt % to about 0.3 wt % of the rheology modifier. The marking composition may include about 0.08 wt % to about 0.17 wt %, about 0.08 wt % to about 0.12 wt %, about 0.12 wt % to about 0.16 wt %, about 0.14 wt % to about 0.16 wt %, about 0.9 wt % to about 1.16 wt %, about 0.9 wt % to about 1.10 wt %, about 1.5 wt % to about 1.8 wt %, about 1.6 wt % to about 1.8 wt %, about 1.65 wt % to about 1.75 wt %, about 1.5 wt % to about 1.65 wt %, or about 1.5 wt % to about 1.6 wt % of the rheology modifier.

The marking composition may include about 0.01 wt % to about 0.2 wt %, about 0.12 wt % to about 0.16 wt %, about 0.01 wt % to about 1 wt %, or about 0.15% of a non-ionic, water soluble cellulose ether. The marking composition may include about 0.01 wt % to about 0.3 wt %, 0.01 wt % to about 0.25 wt %, about 0.05 wt % to about 1.9 wt %, about 0.08 wt % to about 0.17 wt %, about 0.9 wt % to about 1.16 wt %, about 1.0%, or about 0.10% of a polyether urea polyurethane. The marking composition may include about 0.01 wt % to about 3.0 wt %, about 0.05 wt % to about 2.0 wt %, about 1.5 wt % to about 2 wt %, about 1.5 wt % to about 1.8 wt %, or about 1.6% to about 1.7% of a phyllosilicate based rheology modifier, such as a mixture of a natural clay and xanthan gum.

The marking composition may yield a composition of any color. The marking composition may yield a composition appearing as the color blue, green, violet, red, orange, yellow, indigo, or black, or any shade thereof. The marking compositions disclosed herein include a colorant having a pigment.

The colorant may include one or more of an organic pigment such as lampblack, phthalo blue, phthalo green, diarylide yellow, organic yellow, perinone orange, organic red, fast red, DPP red, quinacridone red, quinacridone violet, carbazole violet, and combinations thereof. Each of pigments may be either powder or predispersed to make the colorant. The marking composition may include phthalo blue. The marking composition may include phthalo green. The marking composition may include diarylide yellow, organic yellow, or a mixture of both diarylide yellow and organic yellow. The marking composition may include phthalo green and diarylide yellow, organic yellow, or a mixture of both diarylide yellow and organic yellow. The marking composition may include phthalo green and organic yellow. The marking composition may include quinacridone violet, carbazole violet or a mixture of both quinacridone violet and carbazole violet. The marking composition may include fast red, DPP red, or a mixture of both fast red and DPP red. The marking composition may include quinacridone red. The marking composition may include perinone orange. The marking composition may include lampblack.

The marking composition may include a total amount of the colorant in an amount of about 9 wt % to about 70 wt %, about 9 wt % to about 50 wt %, about 10 wt % to about 30 wt %, or about 15 wt % to about 50 wt % of a colorant. Table 1 below presents exemplary ranges for the various colorants.

It was discovered that when the total amount of colorant is less than about 9.0 wt %, there is poor color differentiation when compared to other colors and poor correspondence between a particular color when viewed under reflective light versus under transmitted light. Conversely, if the total amount of colorant is greater than about 70.0 wt % the resulting marking composition may be unable to form a continuous film (when applied to tissue), resulting in distortion of the color under both reflective and transmitted light. In addition, the marking composition may have poor adherence to the tissue.

A blue marking composition appears blue in color under reflected and/or transmitted light and includes at least one blue pigment and may contain a pigment of another color. The marking composition may include at least about 15 wt %, about 15 wt % to about 60 wt %, about 18 wt % to about 50 wt %, about 20 wt % to about 40 wt %, about 20 wt % to about 30 wt %, about 20 wt % to about 25 wt %, about 21 wt % to about 23 wt %, or about 22 wt % of a blue colorant (a colorant including a blue pigment). The blue colorant may include a pigment comprising phthalo blue, ultramarine blue, or other blue pigment, or a combination thereof. For example, the blue colorant may include a pigment comprising phthalo blue.

An orange marking composition appears orange in color under reflected and/or transmitted light and includes at least one orange pigment and may contain a pigment of another color. The marking composition may include about 20 wt % to about 70 wt %, about 20 wt % to about 50 wt %, about 20 wt % to about 40 wt %, about 20 wt % to about 30 wt %, about 21 wt % to about 25 wt %, or about 23 wt % to about 24 wt % of an orange colorant (a colorant including an orange pigment). The orange colorant may include a pigment comprising perinone orange, quinacridone gold, DNA orange, benzimidazolone orange, organic orange, dinitroaniline orange, diketo-pyrrolo-pyrrol orange, naphthol red, other orange, red or yellow pigment, or any combination thereof. For example, the orange colorant may include a pigment comprising perinone orange.

A black marking composition appears black in color under reflected and/or transmitted light and includes at least one black pigment and may contain a pigment of another color. The marking composition may include about 13 wt % to about 50 wt %, about 15 wt % to about 45 wt %, about 20 wt % to about 40 wt %, about 25 wt % to about 40 wt %, about 30 wt % to about 40 wt %, about 36 wt % to about 39 wt % or about 37 wt % to about 38 wt % of a black colorant (a colorant including a black pigment). The black colorant may include a pigment comprising lampblack, carbon black, or a combination thereof. For example, the black colorant may include a pigment comprising lampblack.

A green marking composition appears green in color under reflected and/or transmitted light and includes at least one green pigment and may contain a pigment of another color. The marking composition may include about 10 wt % to about 20 wt %, about 12 wt % to about 18 wt %, about 13 wt % to about 15 wt %, or about 13 wt % to about 14 wt % of a green colorant (a colorant including a green pigment). The green colorant may include a pigment comprising phthalo green, unicert green, or other green pigment. For example, the green colorant may include a pigment comprising phthalo green. When a yellow colorant is mixed with a green colorant to make a green marking composition, the marking composition may include about 2 wt % to about 8 wt %, about 3 wt % to about 6 wt %, about 5 wt % to about 6 wt % of the yellow colorant (a colorant including a yellow pigment). The yellow colorant which may be included in the green marking composition may include a pigment comprising diarylide yellow, organic yellow, or a combination thereof.

A yellow marking composition appears yellow in color under reflected and/or transmitted light and includes at least one yellow pigment and may contain a pigment of another color. The yellow marking composition may include about 4 wt % to about 13 wt %, about 5 wt % to about 12 wt %, about 8 wt % to about 11 wt %, or about 9 wt % to about 10 wt % of a yellow colorant (a colorant including a yellow pigment). The yellow colorant may include a pigment comprising diarylide yellow, organic yellow, yellow oxide, naphthol yellow, or a combination thereof. For example, the yellow colorant may include a pigment comprising diarylide yellow, organic yellow, or a combination thereof.

A violet marking composition appears violet in color under reflected and/or transmitted light and includes at least one violet pigment and may contain a pigment of another color. The violet marking composition may include about 2 wt % to about 11 wt %, about 3 wt % to about 10.5 wt %, about 3 wt % to about 10 wt %, about 2 wt % to about 4 wt %, about 3 wt % to about 4 wt %, or about 3.2 wt % to about 3.4 wt %, about 9 wt % to about 11 wt %, about 9 wt % to about 10.5 wt %, or about 10 wt % of a violet colorant (a colorant including a violet pigment). The violet colorant may include a pigment comprising quinacridone violet, carbazole violet, diarylide violet, or a combination thereof. For example, the violet colorant may include a pigment comprising quinacridone violet, carbazole violet, or a combination thereof.

A red marking composition appears red in color under reflected and/or transmitted light and includes at least one red pigment and may contain a pigment of another color. The marking composition may include about 5 wt % to about 30 wt %, about 10 wt % to about 30 wt %, about 15 wt % to about 25 wt %, about 18 wt % to about 22 wt %, or about 20 wt % to about 22 wt %, about 5 wt % to about 20 wt %, about 8 wt % to about 15 wt %, about 10 wt % to about 12 wt %, about 10 wt % to about 11 wt %, or about 10.5 wt % to about 11 wt % of a red colorant (a colorant including a red pigment). The red colorant may include a pigment comprising fast red, DPP red, naphthol red, quinacridone magenta, quinacridone red, organic red, toluidine red, red oxide, or other red pigment, or a combination thereof. For example, the red colorant may include a pigment comprising fast red, DPP red, or a combination thereof.

The marking composition may further include an extender. The extender utilized in the marking composition may include ultra-fine titanium dioxide, nanoparticulate titanium dioxide, aluminum silicate, talc, diatomaceous earth, pearl mica, kaolin clay, other transparent particles, or any combination thereof. The ultra-fine titanium dioxide or nanoparticulate titanium dioxide may have a particle size less than about 500 nm, less than about 300 nm, less than about 100 nm or less than about 50 nm. The extender may be organic or inorganic. When present, the extender may be included in an amount of about 9 wt % to about 65 wt %, about 9 wt % to about 60 wt %, about 9 wt % to about 50 wt %, about 9 wt % to about 40 wt %, about 9 wt % to about 30 wt %, about 15 wt % to about 65 wt %, about 15 wt % to about 60 wt %, about 15 wt % to about 50 wt %, about 15 wt % to about 40 wt %, about 20 wt % to about 40 wt %, about 25 wt % to about 65 wt %, about 25 wt % to about 61 wt %, about 25 wt % to about 50 wt %, about 25 wt % to about 40 wt %, or about 25 wt % to about 30 wt %, based on total weight of the composition. For example, the marking composition may include at least about 22 wt % at least about 33 wt %, at least about 25 wt %, at least about 29 wt %, at least about 30 wt %, less than about 40 wt %, less than about 35 wt %, less than about 55 wt %, or less than about 60 wt % of the extender, or a range between any two of these values. In some instances, the marking composition may be formulated without the addition of an extender.

The extender used in the marking composition would be compatible with the colorant and would not diminish the color of the pigment. For example, when using a colorant includes a pigment selected from phthalo blue, carbazole violet, quinacridone violet, or a combination thereof, the extender used in the marking composition may include ultra-fine titanium dioxide (e.g., an ultrafine titanium dioxide dispersion prepared in propylene glycol/water). The marking composition may include about 25 wt % to about 65 wt %, about 26 wt % to about 50 wt %, about 33 wt % to about 35 wt %, about 55 wt % to about 60 wt %, about 35 wt %, or about 58 wt % of an ultra-fine titanium dioxide.

As another example, when using a colorant including a pigment comprising phthalo green, organic yellow, diarylide yellow, or a combination thereof, the extender used in the marking composition may include kaolin clay. The marking composition may include about 9 wt % to about 30 wt %, about 22 wt % to about 40 wt %, about 25 wt % to about 29 wt %, about 27 wt %, or about 28 wt % of kaolin clay. When using kaolin clay as the extender, the marking composition may further comprise a dispersant and/or a buffer (e.g. amine buffer).

When using a colorant including a pigment comprising lampblack, fast red, DDP red, perinone orange, or a combination thereof, the marking composition may be formulated with no extender.

As an example, a tissue marking composition may include a film forming resin comprising an acrylic resin; 0.01 wt % to 1.0 wt % of a polyether urea polyurethane rheology modifier, wherein wt % is based on total weight of the composition, a colorant comprising a blue pigment, a colorant comprising a violet pigment, or a combination thereof, an extender comprising titanium dioxide, wherein the composition has a viscosity of about 70 KU to about 110 KU at room temperature.

In another example, the tissue marking composition may comprise a film forming resin comprising an acrylic resin, 0.01 wt % to 1.0 wt % of a polyether urea polyurethane rheology modifier, wherein wt % is based on total weight of the composition, a colorant comprising an orange pigment, wherein the composition has a viscosity of about 70 KU to about 110 KU at room temperature.

Another exemplary tissue marking composition may include a film forming resin comprising an acrylic resin, greater than 0% to up to 2.0 wt % of a rheology modifier comprising a phyllosilicate, wherein wt % is based on total weight of the composition, a colorant comprising a red or a black pigment, wherein the composition has a viscosity of about 70 KU to about 110 KU at room temperature.

In another example, a tissue marking composition may include a film forming resin comprising an acrylic resin, 0.01 wt % to 0.25 wt % of a rheology modifier comprising cellulose, wherein wt % is based on total weight of the composition, a colorant comprising a green pigment, a colorant comprising a yellow pigment, or a combination thereof, a dispersant, an extender comprising clay, wherein the composition has a viscosity of about 70 KU to about 110 KU at room temperature.

As shown in FIGS. 1 and 2, the marking compositions of this disclosure (Prototype) performed better than reference marking composition s (Ref. A and Ref. B). Additionally, the marking compositions described herein (Prototype) were able to achieve greater than 75% coverage and about 0.02 mm of thickness. This superiority held across different tissue treatments (e.g. fresh with or without fixative).

As shown in FIGS. 3 and 4, the marking compositions described herein (Prototype) also showed stronger adherence when applied to a varied of tissue types, including fat, bone, muscle, and serosa over reference marking composition s (Ref. A and Ref. B).

At room temperature, the marking composition may have a viscosity of about 70 KU (Krebs Units) to about 110 KU when measured using ASTM D562. An marking composition which is highly viscous may have poor transfer from the applicator to tissue. An marking composition that has a low viscosity (that is too thin) may result in an marking composition that is watery and has too low a viscosity, resulting in dripping, running, and migration when applied to tissue, resulting in the loss of fidelity between where the marking composition is applied and the ultimate interpretation of the margins. An additional result is poor "film build," or the thickness with which a layer of marking composition adheres to the tissue; poor film build compromises opacity, or the vividness with which the marking color is visible under reflective light on the tissue. In addition, poor film build adversely affects the ability to detect the marking composition on the microscopic slide.

The marking composition disclosed herein may have a viscosity from about 70 KU (Krebs Units) to about 110 KU, about 70 KU to about 100 KU, about 70 KU to about 90 KU, about 79 KU to about 100 KU, about 79 KU to about 90 KU, about 70 KU to about 90 KU. The marking composition may have a viscosity of about 70 KU, about 71 KU, about 77 KU, about 79 KU or about 81 KU. About 24 hours after production, the marking composition s may have a viscosity from about 80 KU to about 100 KU, about 80 KU to about 90 KU, or about 81 KU to about 89 KU. About 24 hours after production, the marking composition may have a viscosity of about 81 KU, about 82 KU, about 83 KU, about 84 KU, about 85 KU, about 87 KU, about 88 KU, about 89 KU, or about 90 KU. The viscosity may be measured using ASTM D562. All viscosities specified herein are at room temperature unless otherwise specifically noted. The viscosity of the marking composition is important as it directly relates to the ability of the marking composition to adhere to the tissue, for example, to the first, second and/or third surfaces of a tissue specimen, respectively, without dripping or bleeding into a crevice of the tissue specimen or onto an adjacent tissue margin.

In additional, viscosity of the marking composition correlates to the coverage and thickness of the marking composition upon application. The thickness of the marking composition on the tissue after application and drying may be about 0.02 mm to about 1 mm, about 0.02 mm to about 0.5 mm, about 0.02 mm to about 0.2 mm, about 0.3 mm to about 0.18 mm, about 0.04 mm to about 0.18 mm, or about 0.04 mm to about 0.1 mm. The percent coverage (which equals the portion of the exterior surface of the tissue where marking composition is present divided by the entire area on which the marking composition was applied) of the marking composition on the tissue after application and drying may be greater than about 60%, greater than about 65%, greater than about 70%, or about 75% to about 100%.

The marking composition disclosed herein may have a pH of at least about 7.0. The marking composition may have a pH of at least about 7.0 to about 9.5, about 8.0 to about 9.0, about 8.0 to about 9.5, or about 8.4 to about 9.0. The marking composition may have a pH of about 8.4, about 8.6, about 8.8, about 8.9 or about 9.0. pH may be measured using ASTM E70.

The marking composition disclosed herein may have a % weight solids of about 25 wt % to about 50 wt %, or about 30 wt % to about 49 wt %. The marking composition may have a weight solids of about 30 wt % to about 32 wt %, about 40 wt %, or about 47 wt % to about 49 wt %. % weight solids were measured per ASTM D2369.

The marking composition disclosed herein may have a % volume solids of about 25 vol. % to about 45 vol. %, or about 27 vol. % to about 41 vol. %. The marking composition may have a % volume solids of about 40 vol. % to about 41 vol. %, or about 33 vol. % to about 34 vol. %.

The marking composition disclosed herein may have a specific gravity (g/mL) of about 0.9 g/mL to about 1.4 g/mL, about 1.0 g/mL to about 1.3 g/mL, or about 1.05 g/mL to about 1.27 g/mL. The marking composition may have a specific gravity (g/mL) of about 1.05 g/mL to about 1.09 g/mL, about 1.14 g/mL to about 1.19 g/mL, or about 1.27 g/mL.

The marking composition disclosed herein may have a density (lb/gal) of about 7.5 lb/gal to about 11.5 lb/gal, about 8.0 lb/gal to about 11.0 lb/gal, or about 8.5 lb/gal to about 10.8 lb/gal. The marking composition may have a density (lb/gal) of about 10.0 lb/gal to about 10.6 lb/gal, about 9.0 lb/gal to about 9.5 lb/gal, or about 8.8 lb/gal. Density was measured using ASTM D1475.

Often, colors of commercially available marking compositions are difficult to distinguish from one another. To perform effectively, each color must be both recognizable and distinguishable from other colors under both reflective light (ordinary lighting conditions, as when the marking composition is applied to tissue in the pathology lab or operating room), and under transmitted light (when light shines through from the opposite side, as when the tissue on a slide is placed under a microscope). When many of the commercially available marking composition are viewed under reflective light, dark colors such as blue, violet and green are often difficult to distinguish from one another and all appear to be black or similar to black. When applied to tissue and viewed on the slides under a microscope using transmitted light, difficulties are often encountered with distinguishing the yellow-orange, orange-red, blue-violet and red-violet marking compositions. Confusion and inaccurately identifying the marking color on the specimen can lead to erroneous interpretation regarding the location of cells that are close to the specimen surface, resulting in re-excision or treatment in an incorrect location within the patient's body, and possibly failure to fully remove the irregular cells resulting in recurrence of the disease.

Color differentiation and intensity under reflected light and transmitted light may be measured using L*a*b measurements, where L* indicates lightness, a* is the red/green value, and b* is the yellow/blue value. L*a*b measurements were made using ASTM D2244. To meet the criteria for reflective light, after application of 1.5 milliliters of marking composition drawdown and allowed to dry for about 2 hours:

- a blue marking composition may have: L* value of about 16 to about 20, about 18 to about 19, or about 18.9; a* value of about 3 to about 4, or about 3.5; and b* value of about −26 to about −30, about −28 to about −29, or about 28.4;
- a green marking composition may have: L* value of about 38 to about 42, about 39 to about 40, or about 39.4; a* value of about −39 to about −41, or about −40; and b* value of about 8 to about 11, about 9 to about 10, or about 9.6;
- a violet marking composition may have: L* value of about 10 to about 13, about 11 to about 12, or about 11.9; a* value of about 12 to about 15, about 13 to about 14, or about 13.7; and b* value of about −20 to about −23, about −21 to about −22, or about −21.5;
- a red marking composition may have: L* value of about 33 to about 36, about 34 to about 35, or about 34.4; a* value of about 24 to about 27, about 25 to about 26, or about 25.2; and b* value of about 15 to about 18, about 16 to about 17, or about 16.2;
- an orange marking composition may have: L* value of about 50 to about 53, about 51 to about 52, or about 51.9; a* value of about 51 to about 54, about 52 to about 53, or about 52.4; and b* value of about 43 to about 46, about 44 to about 45, or about 44.7;
- a yellow marking composition may have: L* value of about 83 to about 86, about 84 to about 85, or about 84.6; a* value of about 7 to about 9, or about 7.5; and b* value of about 92 to about 94, about 93 to about 94, or about 93.3; and
- a black marking composition may have: L* value of about 23 to about 26, about 24 to about 25, or about 24.4; a* value of about 0 to about 1, about 0.1 to about 0.5, or about 0.15; and b* value of about −1 to about 0, about −0.1 to about 0, or about −0.09.

Delta E is a metric for understanding how the human eye perceives color difference. Delta E is a standard measurement that quantifies the difference between two colors using L*a*b* coordinates. On a typical scale, the Delta E value will range from 0 to 100. A Delta E≤1.0 would not be perceptible by human eyes. At a Delta E between 1-2, differences in the colors would be perceptible through close observation. At a Delta E of 2-10, the differences between the colors would be perceptible at a glance. If the Delta E was measured to be 11-49, the two colors would be considered more similar than opposite whereas at a Delta E of 100, the two colors would be considered exact opposites.

The marking composition described herein may have an average Delta E ("ΔE") when compared to a marking composition of a different color of at least 30 under both reflected and transmitted light. For the marking compositions to perform well for their function, the average Delta E must be maximized under both lighting conditions; this is difficult because the lighting conditions can require opposing properties in the marking compositions. For example, when comparing yellow and red, yellow, and orange, or orange and red colored compositions, the average Delta E may be greater than about 60, such as greater than about 63, or greater than about 65, greater than about 68 under both reflected and transmitted light. When comparing blue and violet, blue and green, or green and violet colored compositions, the average Delta E may be greater than about 30, such as greater than about 33, under reflected light, and at least about 65, such as at least about 60, under transmitted light. When comparing red and violet, or blue and violet colored compositions, the average Delta E may be greater than about 70, such as greater than about 75, under reflected light, and at least about 35, such as at least about 30, under transmitted light. The marking compositions may have an average ΔE of at least about 40, at least about 60, at least about 60, at least about 65, at least about 68 in both transmitted light and reflected light.

As shown in FIGS. 5 and 6, L*a*b* values were used to compute the Delta E using the following formula:

$$\Delta E_{ab}* = \sqrt{\Delta L^{*2} + \Delta a^{*2} + \Delta b^{*2}}$$

As an example, a drawdown bar was used to apply a 1.5 mL uniform film to identical drawdown cards. The marking composition was allowed 24 hours to dry and then the L*a*b* reading was obtained from a defined area on each card under identical ambient reflected lighting conditions. For transmitted light, marking compositions were applied to fresh tissue per the standard IFU, processed, cut and turned in H&E slides. The slides were then photographed using constant lighting conditions. A color picker was then used to obtain the L*a*b* readings.

The differences between marking colors both under reflected (FIG. 5) and transmitted (FIG. 6) lighting conditions were calculated. The marking compositions of this disclosure (Prototype) were easily differentiated from one another under both reflected and transmitted light in contrast with the reference marking compositions (Ref. A and Ref. B).

Also disclosed is a method of identifying an orientation of a tissue specimen having first, second and third surfaces. The method includes providing at least three marking compositions having three different colors, the marking compositions having properties that cause each of said marking compositions to adhere to the first, second and third surfaces of a tissue specimen, respectively, without bleeding into a crevice of the tissue specimen or onto an adjacent tissue margin. In surgical procedures that involve re-excisions the method includes marking a surface with only one marking composition that adheres to the surface of the re-excised tissue specimen.

The marking composition may include one or more additional ingredients. For example, the marking composition may include a defoamer, preservative, dispersant, additional solvent, such as deionized water, buffer, surfactant, or any combination thereof. Any known defoamer, preservative, dispersant, buffer, or surfactant for use in the art may be used.

The marking compositions disclosed herein may further include a preservative. A preservative in the amount of at least about 0.2 wt %, at least about 0.30 wt %, at least about 0.40 wt %, such as about 0.20 wt % to about 0.50 wt %, about 0.20 wt % to about 0.40 wt %, about 0.30 wt % to about 0.40 wt %, or about 0.25 wt % to about 0.4 wt % may be added to the marking composition to prevent bacteria or mold growth in the marking composition. The preservative may include 1,2-Benzisothiazolin-3-one (BIT), 5-Chloro-2-methyl-4-isothiazolin-3-one (CMIT), and/or 2-Methyl-4-isothiazolin-3-one (MIT), or a water-based dispersion of a blend of MIT, BIT and CMIT. An inadequate amount of preservative in the marking composition may result in bacteria and/or mold growth in the marking composition, which can distort the color under both reflective and transmitted light. For example, mold may appear as black spots in the marking composition under both reflective and transmitted light.

The marking compositions disclosed herein may further include a defoaming agent. The defoaming agent may be present in the marking composition in the amount of about 0.1 wt % to about 2.0 wt %, about 0.1 wt % to about 1.4 wt %, 0.18 wt % to about 1.3 wt %, about 0.2 wt % to about 1.2 wt %, or about 0.2 wt % to about 1.1 wt % may be added to the marking composition. The defoamer may be present in about 0.18 wt %, 0.2 wt %, about 0.3 wt %, about 0.5 wt %, about 0.75 wt %, about 0.8 wt %, about 0.4 wt %, about 1.0 wt %, about 1.2 wt %, about 1.3 wt %, or a range between any two of these values. A marking composition not having enough defoaming agent would be susceptible to foaming and lack viscosity stability, resulting in an apparent change in volume or density over time as the finished product is handled, shipped, or stored. For example, a marking composition may completely fill a container upon packaging, but when the container is opened at a later date, the volume of marking composition may appear significantly reduced. A marking composition having an amount of defoaming agent greater than that listed above would have irregularities (holes or weak spots in the coverage) because surface tension of the marking composition is too low. This may diminish the readability of the marking composition s on the microscopic slides. The defoaming agent may comprise a mixture of hydrophobic solids and foam destroying polymers, such as a synheric foam control agent or a silicone-free, polymer-based defoamer which may be low VOC or VOC free, such as those available under the trademark BYK®-011, BYK®-012, Suppressor™ 2369 FC2369, or Suppressor™ 2333 (FC2333).

The marking compositions described herein may further include a dispersant. The dispersant may be in an amount of about 3.0 wt % to about 10.0 wt %, about 4.0 wt % to about 8.0 wt %, or about 5.0 wt % to about 6.0 wt % based on total weight of the composition. The dispersant may be a copolymer with pigment affinity groups, such as those available under the trademark Disperbyk® 199 or Troysperse™ ZWD1 or Troysperse™ 90W. When using an extender such as kaolin clay, the marking composition may include a dispersant. In certain other embodiments, the marking composition does not include a dispersant.

The marking compositions described herein may further include a solvent. A solvent in an amount of about 25 wt % to about 35 wt % may be added to the marking composition. Deionized water in an amount of about 25 wt % to about 35 wt %, about 30 wt % to about 34 wt %, or about 32 wt % to about 33 wt % may be added to the marking composition. In certain embodiments (for example, when using a pigment selected from phthalo blue, carbazole violet, quinacridone violet, perinone orange, and any combination thereof), the marking composition does not include deionized water. When using a pigment selected from lampblack, fast red, DDP red, or a combination thereof, the marking composition may contain deionized water and no amount of an extender. The marking composition may include both an extender and deionized water. When using a pigment selected from phthalo green, organic yellow, diarylide yellow, or a combination thereof, the marking composition may include the extender being kaolin clay, and deionized water.

The marking compositions described herein may further include a buffer. The buffer may be in an amount of about 0.01 wt % to about 0.2 wt %, about 0.02 wt % to about 0.1 wt %, about 0.03 wt %, or about 0.04 wt % based on total weight of the composition. The buffer may comprise an amine, such as an alkanolamine (e.g. those available under the trademark AMP-95™ or AdvanTex®). When using a pigment selected from phthalo green, organic yellow, diarylide yellow, or a combination thereof, the marking composition may include a buffer. In certain embodiments, the marking composition does not include a buffer.

The marking compositions described herein may be sterile allowing for use within sterile fields. Non-sterile marking compositions may allow contamination of the sterile field. If the surgeon applies non-sterile marking compositions while in the operating room, the non-sterile marking compositions may not be used in the sterile field, which introduces the risk of errors if the specimen is carried across the room to the non-sterile area before it is marked or if marking is delayed until the surgery is complete. Use of non-sterile marking compositions during surgery may also prolong the surgical procedure because this practice may require that the surgeon use a double layer of gown and gloves or repeat the processing of scrubbing and gowning in order to handle the non-sterile marking compositions and then return to the sterile field. Sterile inks may also be useful in the pathology lab when non-contamination of the tissue is important.

As shown in FIG. 8, the marking compositions of this disclosure photograph well and are clearly distinguishable in visible light but are invisible in a radiograph and do not leave any residue that may be confused for microcalcifications or potentially diseased cells.

The marking compositions may be made by mixing colorant with the film forming resin and adding the rheology modifier to the resultant mixture to adjust the viscosity to the desired value. The method of making the marking compositions may further include adding the defoamer to the film forming resin before the colorant is mixed in. The resultant mixture may further include a preservative, a solvent, a buffer, an extender, a dispersant, or any combination thereof. These ingredients may be added in any order into the resultant mixture, such as before, after or while mixing the colorant with the film forming resin. Alternatively, the ingredients may be added in a particular order, such as adding the ingredients in the following order: solvent, rheology modifier, dispersant and extender. The thickener is added toward the end, and the AMP-95 has to be added after the bermocoll is mixed in One or more of these ingredients could be mixed in under agitation. As an alternative, the film forming resin may be added to the rheology modifier before mixing with the colorant. The marking compositions may be created under agitation achieving a Hegman grind of 4+, such as 5+, 6+ or 7+.

The method of making the marking compositions described herein may further comprise subjecting the marking compositions to gamma radiation to produce a sterile ink. The gamma radiation may be applied at about 20 kiloGrays (kGy) to about 60 kGy, about 25 kiloGrays (kGy) to about 60 kGy, about 25 kiloGrays (kGy) to about 45 kGy, about 27 kGy to about 39 kGy, or about 33 kGy.

Inks in accordance with this disclosure may be utilized to identify the orientation of a tissue specimen. The method of initially identifying the orientation of a tissue specimen having multiple surfaces, such as first, second and third surfaces, includes providing multiple inks with each being a different color, the marking compositions having properties that cause each of said different colored inks to adhere to one of the surfaces of a tissue specimen, respectively, without bleeding into a crevice of the tissue specimen or onto an adjacent tissue margin. In surgical procedures that involve re-excisions, the method may include marking a surface with only one ink that adheres to the surface of the tissue specimen.

A method of marking a tissue may include contacting the tissue with an marking composition comprising a film forming resin comprising an acrylic resin, a rheology modifier comprising a polyether urea polyurethane, a phyllosilicate, a cellulose, or a combination thereof, and a colorant, wherein the composition has a viscosity of about 70 KU to about 110 KU at room temperature, and wherein if the composition comprises a rheology modifier comprising cellulose, the rheology modifier comprising cellulose is in an amount of about 0.01 wt % to about 0.25 wt % based on the total weight of the composition.

Either before or after the marking is applied, the tissue may be preserved in a fixing solution. The fixing solution may comprise formalin, such as phosphate buffered formalin, alcoholic formalin, or zinc formalin, formal calcium, formal saline, formal acetic alcohol, or any combination thereof. Adherence of the marking to the tissue is important as stated above because poor adherence may result in the marking composition washing off when the tissue is pretreated with formalin before marking, submerged in formalin after a marking composition is applied, or when a knife is used to cut through the marked specimen. FIG. 7 shows a bar graph which illustrates the amount based on a gray scale of rating where a lower value indicates more leeching of the marking composition into formalin and a higher value indicates little or no leeching. As shown in FIG. 7, all marking colors of the prototype marking compositions had no leeching whereas the various marking colors of the reference marking compositions (Ref. A and Ref. B) had varying amounts of leeching.

The marking compositions described herein may be included in a kit. A kit may include an marking composition and instructions for use thereof, wherein the marking composition comprises a film forming resin comprising an acrylic resin, a rheology modifier comprising a polyether urea polyurethane, a phyllosilicate, a cellulose, or a combination thereof, and a colorant, wherein the composition has a viscosity of about 70 KU to about 110 KU at room temperature, and wherein if the composition comprises a rheology modifier comprising cellulose, the rheology modifier comprising cellulose is in an amount of about 0.01 wt % to about 0.25 wt % based on the total weight of the composition. The kit may further include a mordant, an applicator, a tray, a surgical clip, a fixing solution, or a combination thereof.

The kit may further include a mordant. The mordant may include a metallic mordant and/or a pH mordant, such as acetic acid, lactic acid, potassium aluminum sulfate, lemon juice, and baking soda. The kit may further include a fixing solution. The fixing solution may comprise formalin, such as phosphate buffered formalin, alcoholic formalin, or zinc formalin, formal calcium, formal saline, formal acetic alcohol, or any combination thereof.

The kit may further include a clip, such as the clip disclosed in U.S. Pat. No. D634,011, U.S. Pat. Nos. 8,301,227, and 8,750,966, each relevant portion of which is incorporated herein by reference in their entirety.

The kit may further include an applicator or a plurality of applicators, such as the one described in U.S. Pat. Nos. 8,301,227 and 8,750,966, the relevant portions of which are incorporated herein by reference in their entirety.

This kit may further include a dispensing device having the marking composition disposed within the lumen of the dispensing device and an applicator tip at one end. The dispensing device may include a cylinder wherein the marking composition is dispensed within the lumen of the cylinder. The applicator tip may comprise a brush or a sponge tip. The other end of the dispensing device may further include a piston, or other mechanism, which moves the composition toward the applicator tip. For example, the mechanism or piston may move the composition towards the applicator tip using a twisting action or a plunging action.

The kit may further include a tray, such as the one described in U.S. Pat. Nos. 8,301,227 and 8,750,966, the relevant portions of which are incorporated herein by reference in its entirety.

The kit may include a plurality of marking compositions and the plurality of marking compositions has an average Delta E of at least about 30 in transmitted light and/or reflected light. The marking compositions may have an average Delta E of at least about 40, at least about 60, at least about 60, at least about 65, at least about 68 in transmitted light and/or reflected light.

As used herein, the term "pigment" means the dry powder used to prepare and contained in a colorant.

As used herein, the term "colorant" means one or more pigments dispersed or pre-dispersed in water or other solvent.

As used herein, the term "ink" and "marking composition" means a colorant or pigment with the additional ingredients set forth herein, which is in final form and ready to be applied to tissue.

As used herein, the term "mordant" means a substance used to set (i.e. bind) the colorant on the tissue by forming a coordination complex with the colorant, which then attaches to the tissue.

As used herein, the term "fixing solution" means a solution used to preserve biological specimens.

As used herein, the term "film forming resin" refers to a resin capable of forming a film on human tissue, such as on fatty tissue, muscle tissue, serosa tissue, diseased tissue, soft tissue, bone, etc.

As used herein, the term "tissue margin" means the edge or border of the tissue that has been removed from a patient. Specific "margins" may refer to a subset of the exterior surface of the excised specimen.

As used herein, the term "reflected light" or "reflected ambient light" refers to ambient lighting conditions where light reflects off a surface, such as light reflecting off the surface of the marked tissue in the pathology lab or operating room.

As used herein, the term "transmitted light" refers to conditions where the light source is located on the opposite side of the subject (in this case, the marked tissue) from the viewer and the subject is illuminated by light that is transmitted through it, such as when a stained-glass window is viewed from inside a building or where the marked tissue is illuminated from below with the microscope light as the user is viewing the tissue through the lens of a microscope.

It must also be noted that as used in the specification and in the appended claims, the singular forms "a", "an", and "the" include plural references unless the context clearly dictates otherwise. Thus, for example, reference to "a colorant" is a reference to one or more colorants and equivalents thereof known to those skilled in the art, and so forth. Also, the terms "includes" and/or "including," when used in this specification, specify the presence of stated features, elements, and/or components, but do not preclude the presence or addition of one or more other features, steps, operations, elements, components, and/or groups thereof.

As used herein, the term "about" means plus or minus 10% of the numerical value of the number with which it is being used. Therefore, about 50% means in the range of 45%-55%.

As used herein, the term "optional" or "optionally" means that the subsequently described event or circumstance may or may not occur, and that the description includes instances where the event occurs and instances where it does not.

As used herein, the term "room temperature" means an indoor temperature of from about 20° C. to about 25° C. (68 to 77° F.).

Throughout the specification of the application, various terms are used such as "primary," "secondary," "first," "second," and the like. These terms are words of convenience in order to distinguish between different elements, and such terms are not intended to be limiting as to how the different elements may be utilized.

As used herein, the term "tissue" refers to any aggregation of similarly specialized mammalian cells which are united in the performance of a particular function, such as human tissue. The tissue may be any human tissue, such as, without limitation, soft tissue, fatty tissue, muscle tissue, bone tissue, serosa, connective tissue, or tissue from organs, such as heart, liver, lungs, brain, etc.

EXAMPLES

Various aspects of the present disclosure will be illustrated with reference to the following non-limiting prophetic examples.

Prophetic Examples

Exemplary formulations are disclosed below in Table 1, along with exemplary ranges (in wt % based on total weight of the composition) for each ingredient.

TABLE 1

EXEMPLARY MARKING COMPOSITIONS

| | Ingredients | Blue | Green | Violet | Red | Orange | Yellow | Black |
|---|---|---|---|---|---|---|---|---|
| Colorant (w/pigment) | Phthalo Blue | 15-30 | | | | | | |
| | Phthalo Green | | 10-20 | | | | | |
| | Organic Yellow | | 2-8 | | | | | |
| | Carbazole Violet | | | 8-11 | | | | |
| | Quniacridone Violet | | | 2-4 | | | | |
| | Diarylide Yellow | | | | | | 5-12 | |
| | Organic Yellow | | | | | | 5-12 | |
| | Fast Red | | | | 15-25 | | | |
| | DPP Red | | | | 8-15 | | | |
| | Perinone Orange | | | | | 20-40 | | |
| | Lamp Black | | | | | | | 25-45 |
| Film-forming resin | NeoCryl ™ | 15-20 | 10-20 | 40-60 | 20-40 | 70-80 | 10-20 | 25-35 |
| Defoaming agent | Byk ™ 011 | 0.1-0.5 | 0.1-0.5 | 0.5-1.3 | 0.1-0.8 | 0.5-1.3 | 0.1-0.5 | 0.1-0.8 |
| Extender | Nano TiO$_2$ | 56-60 | | 33-35 | | | | |
| | Kaolin clay | | 26-29 | | | | 26-29 | |
| Dispersant | Disperbyk ™ 199 | | 1-10 | | | | 1-10 | |
| Solvent | DI Water | | | 20-40 | | 20-40 | 20-40 | 20-40 |
| Buffer | AMP 95 | | | 0.01-0.05 | | | 0.01-0.05 | |
| Rheology modifier | Rheolate ™ 666 | 0.05-0.5 | | | 0.5-1.2 | 0.005-0.05 | | |
| | Bermocoll ™ | | 0.1-0.2 | | | | 0.1-0.2 | |
| | Optigel ™-WX | | | | | 1.6-1.75 | | 1.3-1.7 |
| Preservative | Proxel ™ BC | 0.1-0.5 | 0.1-0.5 | 0.1-0.5 | 0.1-0.5 | 0.1-0.5 | 0.1-0.5 | 0.1-0.5 |
| Totals | | 100 | 100 | 100 | 100 | 100 | 100 | 100 |

Preparation of Marking Compositions

Example A

A blue marking composition is prepared by slowly adding the specified amount of film forming resin into a mixer. Turn the mixer on within the mixing vessel between 600-800 RPM to create a vortex without splashing. Slowly add the defoaming agent, the blue colorant(s), extender, and preservative in that order. Mix for 20 minutes. Turn the mixer off and store the contents sealed for a period greater than 24 hours. Once 24 hours or more have passed, uncover the vessel, turn on the mixer and slowly add the rheology modifier. Mix for 20 minutes adjusting the mixing speed as the viscosity increases.

Example B

A green marking composition is prepared by charging the mixing vessel with deionized water. Turn the mixer on within the mixing vessel to create a vortex without splashing. Under good agitation, slowly add the dispersant and defoaming agent. Then slowly add the extender and disperse the mixture for 30 minutes at approximately 1700 RPM. Once Hegman grind is 7 or greater, reduce speed to mixing with good agitation. Slowly add the specified amount of film forming resin and mix to create a vortex without splashing. Slowly add green and/or yellow colorant(s), preservative, rheology modifier and amine buffer. Mix for 20 minutes adjusting the mixing speed as the viscosity increases until thoroughly mixed.

Example C

A violet marking composition is prepared by charging the mixing vessel with the specified amount of film forming resin. Turn the mixer on within the mixing vessel between 600-800 RPM to create a vortex without splashing. Slowly add the defoaming agent, the violet colorant(s), extender, preservative, and rheology modifier. Mix for 20 minutes adjusting the mixing speed as the viscosity increases until thoroughly mixed.

Example D

A red marking composition is prepared by charging the mixing vessel with deionized water. Turn the mixer on within the mixing vessel to create a vortex without splashing. Under good agitation, slowly add the rheology modifier. Mix for 20 minutes. Then slowly add the film forming resin, the defoaming agent, the red colorant(s), and the preservative. Mix for 20 minutes adjusting the mixing speed as the viscosity increases until thoroughly mixed.

Example E

An orange marking composition is prepared by slowly adding the specified amount of film forming resin into a mixer. Turn the mixer on within the mixing vessel between 600-800 RPM to create a vortex without splashing. Slowly add the defoaming agent, the orange colorant(s), rheology modifier, and preservative. Mix for 20 minutes adjusting the mixing speed as the viscosity increases until thoroughly mixed.

Example F

A yellow marking composition is prepared by charging the mixing vessel with deionized water. Turn the mixer on within the mixing vessel to create a vortex without splashing. Under good agitation, slowly add the dispersant and defoaming agent. Then slowly add the extender and disperse the mixture for 30 minutes at approximately 1700 RPM. Once Hegman grind is 7 or greater, reduce speed to mixing with good agitation. Slowly add the specified amount of film forming resin and mix to create a vortex without splashing. Slowly add yellow colorant(s), preservative, rheology modifier and amine buffer. Mix for 20 minutes adjusting the mixing speed as the viscosity increases until thoroughly mixed.

Example G

A black marking composition is prepared by charging the mixing vessel with deionized water. Turn the mixer on within the mixing vessel to create a vortex without splashing. Under good agitation, slowly add the rheology modifier. Mix for 20 minutes. Then slowly add the film forming resin, the defoaming agent, the black colorant(s), and the preservative. Mix for 20 minutes adjusting the mixing speed as the viscosity increases until thoroughly mixed.

Although the disclosed technology has been described in considerable detail with reference to certain preferred embodiments thereof, other versions are possible. Therefore, the spirit and scope of the appended claims should not be limited to the description and the preferred versions contained within this specification.

What is claimed is:

1. A tissue marking composition, comprising:
   a film forming resin comprising an acrylic;
   a rheology modifier comprising an associative polyurethane, a phyllosilicate, a cellulose, or a combination thereof;
   a colorant; and
   an extender in an amount of about 25 wt % to about 61 wt % based on the total weight of the composition;
   wherein the composition has a viscosity of about 70 KU to about 110 KU at room temperature, and wherein if the composition comprises a rheology modifier comprising cellulose, the rheology modifier comprising cellulose is in an amount of about 0.01 wt % to about 0.25 wt % based on the total weight of the composition.

2. The marking composition of claim 1, wherein the acrylic resin comprises an alkali soluble styrene.

3. The marking composition of claim 1, wherein the rheology modifier is in an amount of about 0.01 wt % to about 2 wt % based on total weight of the composition.

4. The marking composition of claim 1, wherein the rheology modifier comprising cellulose comprises ethyl hydroxyethyl cellulose or methyl ethyl hydroxyethyl cellulose.

5. The marking composition of claim 3, further comprising an amine buffer in an amount of about 0.01 wt % to about 0.05 wt % based on total weight of the composition.

6. The marking composition of claim 1, wherein the rheology modifier comprising an associative polyurethane comprises a polyether urea polyurethane rheology modifier in an amount of about 0.01 wt % to about 1 wt % based on total weight of the composition.

7. The marking composition of claim 1, wherein the composition has a pH of about 8.0 to about 9.0.

8. The marking composition of claim 1, further comprising a preservative, a defoaming agent, a solvent, a dispersant, or a combination thereof.

9. The marking composition of claim 1, wherein the composition has a reflective light value in the L.a.b. color space in dimension L of about 11 to 85, in dimension a of about −40 to 53, and in dimension b of about −29 to about 94.

10. The marking composition of claim 1, wherein the film forming resin is in an amount of about 8 wt % to about 77 wt % based on total weight of the composition.

11. The marking composition of claim 1, wherein the colorant is in an amount of about 11 wt % to about 40 wt % based on total weight of the composition.

12. The marking composition of claim 8, wherein the preservative is in an amount of about 0.2 wt % to about 0.5 wt % based on total weight of the composition.

13. The marking composition of claim 8, wherein the defoaming agent is in an amount of about 0.18 wt % to about 1.3 wt % based on total weight of the composition.

14. The marking composition of claim 8, wherein the solvent is in an amount of about 25 wt % to about 35 wt % based on total weight of the composition.

15. The marking composition of claim 1, wherein the composition has a Delta E in reflected light when compared to a marking composition of a different color of at least about 30.

16. The marking composition of claim 1, wherein the composition has a Delta E in transmitted light when compared to a marking composition of a different color of at least about 30.

17. The marking composition of claim 1, wherein the marking composition is sterile.

18. The marking composition of claim 1, wherein the marking composition has an average drying time of about 3 minutes or less.

\* \* \* \* \*